United States Patent
Wilson et al.

(10) Patent No.: US 8,588,012 B2
(45) Date of Patent: Nov. 19, 2013

(54) BALANCED ON-DIE TERMINATION

(75) Inventors: John Wilson, Raleigh, NC (US);
Joong-Ho Kim, San Jose, CA (US);
Ravindranath Kollipara, Palo Alto, CA (US); David Secker, San Jose, CA (US);
Kyung Suk Oh, Cupertino, CA (US)

(73) Assignee: Rambus, Inc., Sunnyvale, CA (US)

( * ) Notice: Subject to any disclaimer, the term of this patent is extended or adjusted under 35 U.S.C. 154(b) by 238 days.

(21) Appl. No.: 13/149,896

(22) Filed: Jun. 1, 2011

(65) Prior Publication Data

US 2011/0314200 A1 Dec. 22, 2011

Related U.S. Application Data

(60) Provisional application No. 61/355,673, filed on Jun. 17, 2010.

(51) Int. Cl.
*G11C 7/00* (2006.01)

(52) U.S. Cl.
USPC .......... 365/192; 365/189.05; 326/30; 326/83; 326/26; 326/29

(58) Field of Classification Search
USPC .............. 365/192, 189.05; 326/30, 83, 26, 29
See application file for complete search history.

(56) References Cited

U.S. PATENT DOCUMENTS

| | | | |
|---|---|---|---|
| 5,467,455 A | 11/1995 | Gay et al. | 395/281 |
| 5,553,250 A | 9/1996 | Miyagawa et al. | 395/309 |
| 5,663,661 A | 9/1997 | Dillon et al. | 326/30 |
| 5,666,078 A | 9/1997 | Lamphier et al. | 327/108 |
| 5,982,191 A | 11/1999 | Starr | 326/30 |
| 5,995,894 A | 11/1999 | Wendte | 701/50 |
| 6,060,907 A | 5/2000 | Vishwanthaiah et al. | 326/87 |
| 6,157,206 A | 12/2000 | Taylor et al. | 326/30 |
| 6,232,792 B1 | 5/2001 | Starr | 326/30 |
| 6,308,232 B1 | 10/2001 | Gasbarro | 710/100 |
| 6,356,105 B1 | 3/2002 | Volk | 326/30 |
| 6,356,106 B1 | 3/2002 | Greef et al. | 326/30 |
| 6,424,200 B1 | 7/2002 | McNitt et al. | 327/308 |
| 6,560,666 B1 | 5/2003 | Harriman et al. | 710/305 |
| 6,762,620 B2 | 7/2004 | Jang et al. | 326/30 |
| 6,781,405 B2 | 8/2004 | Best | 326/30 |
| 6,856,169 B2 | 2/2005 | Frans | 326/82 |
| 6,894,691 B2 | 5/2005 | Juenger | 345/531 |

(Continued)

FOREIGN PATENT DOCUMENTS

DE 102005036528 2/2007
JP 07-084863 3/1995

(Continued)

OTHER PUBLICATIONS

Exhibit A-4—JEDEC Standard, "DDR3 SDRAM Specification," JESD79-3B (Revision of JESD79-3A, Sep. 2007), Apr. 2008, JEDEC Solid State Technology Association, regarding Patent Owner's Response to Office Action dated Aug. 17, 2009. 200 pages.

(Continued)

*Primary Examiner* — Connie Yoha
(74) *Attorney, Agent, or Firm* — Charles Shemwell

(57) ABSTRACT

Termination of a high-speed signaling link is effected by simultaneously engaging on-die termination structures within multiple integrated-circuit memory devices disposed on the same memory module, and/or within the same integrated-circuit package, and coupled to the high-speed signaling link.

24 Claims, 7 Drawing Sheets

(56) References Cited

U.S. PATENT DOCUMENTS

| | | | |
|---|---|---|---|
| 6,924,660 B2 | 8/2005 | Nguyen | 326/30 |
| 6,965,529 B2 | 11/2005 | Zumkeher et al. | 365/189.05 |
| 6,980,020 B2 | 12/2005 | Best | 326/30 |
| 6,981,089 B2 | 12/2005 | Dodd et al. | 710/308 |
| 7,102,200 B2 | 9/2006 | Fan et al. | 257/379 |
| 7,103,792 B2 | 9/2006 | Moon | 713/500 |
| 7,123,047 B2 | 10/2006 | Lim | 326/30 |
| 7,148,721 B2 | 12/2006 | Park | 326/30 |
| 7,414,426 B2 | 8/2008 | Cox et al. | 326/30 |
| 7,486,104 B2 * | 2/2009 | Oh et al. | 326/30 |
| 7,514,955 B2 * | 4/2009 | Kim | 326/30 |
| 7,786,752 B2 * | 8/2010 | Oh et al. | 326/30 |
| 2002/0178318 A1 | 11/2002 | Muff | 710/305 |
| 2003/0012046 A1 | 1/2003 | Lee et al. | 365/63 |
| 2003/0016550 A1 | 1/2003 | Yoo et al. | 365/63 |
| 2003/0039151 A1 | 2/2003 | Matsui | 365/195 |
| 2004/0098528 A1 | 5/2004 | Janzen | 710/305 |
| 2004/0201402 A1 | 10/2004 | Rajan | 326/30 |
| 2004/0228196 A1 | 11/2004 | Kwak et al. | 365/230.3 |
| 2005/0212551 A1 | 9/2005 | So et al. | 326/30 |
| 2005/0226080 A1 | 10/2005 | Lee | 365/230.03 |
| 2005/0228912 A1 | 10/2005 | Walker et al. | 710/107 |
| 2005/0264316 A1 | 12/2005 | Atkinson | 326/30 |
| 2006/0007761 A1 | 1/2006 | Ware et al. | 365/194 |
| 2006/0071683 A1 | 4/2006 | Best et al. | 326/30 |
| 2006/0077731 A1 | 4/2006 | Ware et al. | 365/194 |
| 2007/0007992 A1 | 1/2007 | Bains et al. | 326/30 |
| 2007/0070717 A1 | 3/2007 | Kim | 365/189.07 |
| 2007/0247185 A1 | 10/2007 | Oie et al. | 326/30 |
| 2008/0112233 A1 * | 5/2008 | Woo et al. | 365/189.05 |
| 2008/0177913 A1 * | 7/2008 | Li | 710/100 |
| 2009/0085604 A1 | 4/2009 | David | 326/30 |
| 2009/0201711 A1 | 8/2009 | Solomon et al. | 365/51 |
| 2009/0303802 A1 | 12/2009 | Lee | 365/189.05 |
| 2009/0313410 A1 | 12/2009 | Jeong et al. | 710/300 |
| 2010/0027356 A1 | 2/2010 | Shaeffer et al. | 365/189.05 |
| 2010/0135097 A1 | 6/2010 | Berke | 365/226 |
| 2010/0226185 A1 | 9/2010 | Lee | 365/189.05 |
| 2011/0057720 A1 | 3/2011 | Komyo et al. | 327/551 |

FOREIGN PATENT DOCUMENTS

| | | |
|---|---|---|
| JP | 10-198473 | 7/1998 |
| JP | 2003-283322 | 10/2003 |
| TW | 2005-119471 | 12/2005 |
| WO | WO 97/02658 | 1/1997 |
| WO | WO 98/04041 | 1/1998 |
| WO | WO 00/41300 | 7/2000 |
| WO | WO 00/70474 | 11/2000 |
| WO | WO 2004-061690 A3 | 7/2004 |
| WO | WO 2007-078496 | 7/2007 |

OTHER PUBLICATIONS

Oh, Kyung Suk, U.S. Appl. No. 13/043,946, filed Mar. 9, 2011, Notice of Allowance and Fee(s) Due dated Nov. 28, 2011. 16 Pages.
PCT Search Report and the Written Opinion dated Nov. 30, 2011 re Int'l Application No. PCT/US2011/038656. 8 pages.
PCT Search Report and the Written Opinion dated Nov. 30, 2011 re Int'l Application No. PCT/US2011/038656. 12 Pages.
JP Office Action dated Jan. 18, 2012 in JP Application No. 2009-513379, including English language translation. 9 pages.
EP Partial European search report dated Mar. 7, 2012 re EP Application No. 1193654.8. 6 pages.
Oh, Kyung Suk, U.S. Appl. No. 13/180,550, filed Jul. 12, 2011, re Notice of Allowance and Fee(s) Due mailed Apr. 2, 2012. 21 pages.
Oh, Kyung-Suk, U.S. Appl. No. 13/180,550, filed Jul. 12, 2011, re Amendment after Notice of Allowance dated Apr. 11, 2012, Includes Comments on Statement of Reasons for Allowance. 13 pages.
JP Response Argument and Amendment dated Apr. 16, 2012 to the Office Action dated Jan. 18, 2012 in JP Application No. 2009-513379. 46 pages.
Oh, Kyung-Suk, U.S. Appl. No. 13/180,550, filed Jul. 12, 2011, Office Action dated May 1, 2012 re Supplemental Notice of Allowability. 4 Pages.
Farrell, Todd, Jedec Standard, DDR3 ODT and Dynamic ODT, MicronTechnology slide presentation dated Oct. 4, 2007. 55 pages.
Johnson, Chris. "The Future of Memory: Graphics DDR3 SDRAM Functionality." Micron Designline, vol. 11, Issue 4, 4Q02, Oct. 2002. 8 Pages.
"JEDEC Standard—DDR2 SDRAM Specification" JESD-2B (Revision of JESD79-2A), JEDEC Solid State Technology Association. Jan. 2005. 112 Pages.
Johnson, Chris, "Graphics DDR3 On-Die Termination and Thermal Considerations." Micron Designline, vol. 12, Issue 1. Rev. Apr. 1, 2003, 1Q03/2Q03. 8 Pages.
Kyungki-Do, Yongin-Si, Korea (R.O.K.), Samsung Electronics Co., Ltd., Application Note GDDR2 ODT On/Off Control Method (Single Rank/Dual Rank), Product Planning & Application Eng. Team, Jul. 2003. 12 Pages.
Farrell, Todd, "Core Architecture Doubles MEM Data Rate," in Electronic Engineering Times Asia, Dec. 16, 2005. 4 Pages.
512M bits DDR3 SDRAM, Preliminary Data Sheet, Elpida Memory, Inc. 2005-2006, Document No. E0785E11 (ver. 1.1), Feb. 2006, www.elpida.com. 4 Pages.
Janzen, Jeff, "DDR2 Offers New Features and Functionality," Designline, vol. 12, Issue 2, Micron, Jul. 31, 2003 EN.L. 16 Pages.
Weidlich, Rainer, "What comes Next in Commodity DRAMS—DDR3," Infineon Technologies, Jun. 2005. 4 Pages.
Hynix and DDR3, Keynote Address at JEDEX Shanghai 2005, Oct. 2005. 24 Pages.
Micron Technical Note, "DDR2-533 Memory Design Guide for Two-DIMM Unbuffered Systems," TN-47-01, 2003. 19 Pages.
Shen, Dr. William Wu, Infineon Technologies, "System Challenges on DDR3 High Speed Clock/Address/Command Fly-by Bus Technology," JEDEX San Jose, Apr. 18, 2006. 47 Pages.
Rhoden, Desi and Lee, D.Y., "DDR/DDR2/DDR3 SDRAM Tutorial Sponsored by," Samsung and Inphi, JEDEX San Jose, Oct. 25-26, 2005. 130 Pages.
Rhoden, Desi, "The Evolution of DDR," Via Technology Forum 2005, Inphi Corp., drhoden@inphi-copr.com. 23 Pages.
Shen, Dr. William Wu, "DDR3 Functional Outlook," JEDEX San Jose, Apr. 2006. 31 Pages.
Shen, Dr. William Wu, "DDR3 Functional Outlook," Infineon, JEDEX Shanghai, Oct. 25-26, 2005. 30 Pages.
Lee, K.H., "MultimediaCard Solutions of Digital Storage Applications," Samsung Electronics, JEDEX Shanghai, Oct. 26, 2005. 28 Pages.
Samsung, "512Mb E-die DDR3 SDRAM Specification", Preliminary Specification, Rev. 0.5, Dec. 2006. 55 Pages.
Gervasi, Bill "DRAM Module Market Overview," SimpleTech, JEDEX Shanghai, Oct. 25-26, 2005. 50 Pages.
Trost, Hans-Peter "Press Presentation DDR3 Introduction," Memory Products Group, Infineon Technologies, AG, Jun. 2005. 11 Pages.
Micron Technical Note, TN-47-07: DDR2 Simulation Support; Rev A 7/05. 4 Pages.
DDR2 ODT Control; Product Planning & Application Engineering Team, Dec. 2004. 8 Pages.
Nanya Technology Corp., "512Mb DDR2 SDRAM," Preliminary Specification, Nanya Technology Corp., Dec. 18, 2003, Rev. 0.2. 80 Pages.
Invitation to Pay Additional Fees and Communication Relating to the Results of the Partial International Search in International Application PCT/US2007/069471, European Patent Office, Jan. 16, 2008. 8 Pages.
International Search Report and the Written Opinion of the International Searching Authority for International Application RBS2.P057WO, European Patent Office, Apr. 7, 2008. 18 Pages.
European Patent Office, Munich, Germany, International Preliminary report on Patentability, Jul. 23, 2008. 9 Pages. (PCT/US2007/069471).
EP Partial European Search Report with mail date of Nov. 11, 2009, for Patent Application 09163220.8. 4 Pages.
Non-Final Office Action with mail date of Dec. 28, 2009, re U.S. Appl. No. 12/507,794. 9 Pages.

(56) References Cited

OTHER PUBLICATIONS

EP Extended Search Report with mail date of Jan. 29, 2010 re EP Application No. 09163220.8. 9 Pages.
EP Response dated Apr. 7, 2010 re EP Application No. 07853485.6-2212 to the Official Communication dated Dec. 8, 2009, includes New claims 1-13 (clear and highlighted amendments) and New description pp. 2, 2a. 14 Pages.
Notice of Allowance and Fee(s) Due with mail date of Apr. 19, 2010 re U.S. Appl. No. 12/507,794 includes Information Disclosure Statement. 5 Pages.
Response dated Mar. 2, 2010 to Office action dated Dec. 28, 2009 re U.S. Appl. No. 12/507,794 includes Terminal Disclaimer and Information Disclosure Statement. 12 Pages.
EP Office Communication pursuant to Article 94(3) EPC with mail date of Aug. 12, 2009 for Application No. 07853485.6-2212. 3 Pages.
CN First Office Action dated Aug. 4, 2010 in CN Application No. 200780020133.3. 11 Pages.
EP Office Communication Pursuant to Article 94(3) EPC, dated Sep. 28, 2010 in EP Application No. 09163220.8. 1 Page.
Information Disclosure Statement dated Nov. 5, 2010, re U.S. Appl. No. 12/861,771. 6 Pages.
Information Disclosure Statement dated Nov. 5, 2010 re U.S. Appl. No. 12/861,771. 2 Pages.
Notice of Allowance and Fee(s) Due with mail date of Nov. 1, 2010 re U.S. Appl. No. 12/861,771 includes Notice of References Cited. 13 Pages.
Response dates Nov. 17, 2010 to Notice of Non-Compliant Information Disclosure Statement re U.S. Appl. No. 12/861,771. 1 Page.
Office Action with mail date of Dec. 27, 2010 re U.S. Appl. No. 12/861,771 re Supplemental Notice of Allowability includes Information Disclosure Statement. 6 Pages.
Office Action with mail of Jan. 7, 2011 re U.S. Appl. No. 12/861,771 re Supplemental Notice of Allowability includes Information Disclosure Statement. 8 Pages.
Informationn Disclosure Statement dated Dec. 14, 2010, In re U.S. Appl. No. 12/861,771. 5 Pages.
Amendment After the Notice of Allowance dated Dec. 17, 2010, re U.S. Appl. No. 12/861,771. 9 Pages.
CN Response dated Dec. 20, 2010 re CN Application No. 200780020133.3. 7 Pages.
JP Request dated Apr. 9, 2009 for Examination and a Voluntary Amendment re JP Application No. 2009-513379. 17 Pages.
Comments on Statement of Reasons for Allowance with mail date of Jan. 26, 2011 re U.S. Appl. No. 12/861,771. 4 Pages.
CN Office Action dated Feb. 21, 2011 re CN Application No. 200780020133.3. 6 Pages.
EP Response dated Mar. 31, 2011 to the Official Communications dated Jan. 29, 2010 and Sep. 28, 2010. 29 Pages.
CN Response dated Mar. 29, 2011 to the Second Office Action dated Feb. 21, 2011 re CN Application No. 200780020133.3. 12 Pages.
Notice of Allowance and Fee(s) Due dated May 16, 2011 re U.S. Appl. No. 13/043,946 includes Notice of References Cited. 17 Pages.
Amendment after Notice of Allowance dated Jun. 15, 2011 re U.S. Appl. No. 13/043,946. 11 Pages.
Supplement Notice of Allowability dated Jun. 9, 2011 re U.S. Appl. No. 13/043,946 includes Information Disclosure Statement. 7 Pages.
Information Disclosure Statement submitted May 30, 2011 re U.S. Appl. No. 13/043,946. 4 Pages.
Information Disclosure Statement submitted May 30, 2011 re U.S. Appl. No. 13/043,946. 1 Page.
Information Disclosure Statement dated May 27, 2011 re U.S. Appl. No. 13/043,946. 2 Pages.
Information Disclosure Statement dated May 27, 2011 re U.S. Appl. No. 13/043,946. 6 Pages.
Preliminary Amendment dated Jun. 30, 2011 re U.S. Appl. No. 13/160,489. 13 Pages.
Information Disclosure Statement dated Jun. 30, 2011 re U.S. Appl. No. 13/160,489. 6 Pages.
Information Disclosure Statement dated Jun. 30, 2011 re U.S. Appl. No. 13/160,489. 2 Pages.
Office Action dated Jul. 22, 2011 re Response to Rule 312 Communication, Amendment After Notice of Allowance for U.S. Appl. No. 13/043,946. 4 Pages.
Information Disclosure Statement dated Aug. 15, 2011 re U.S. Appl. No. 13/043,946 includes Request for Continued Examination. 7 Pages.

\* cited by examiner

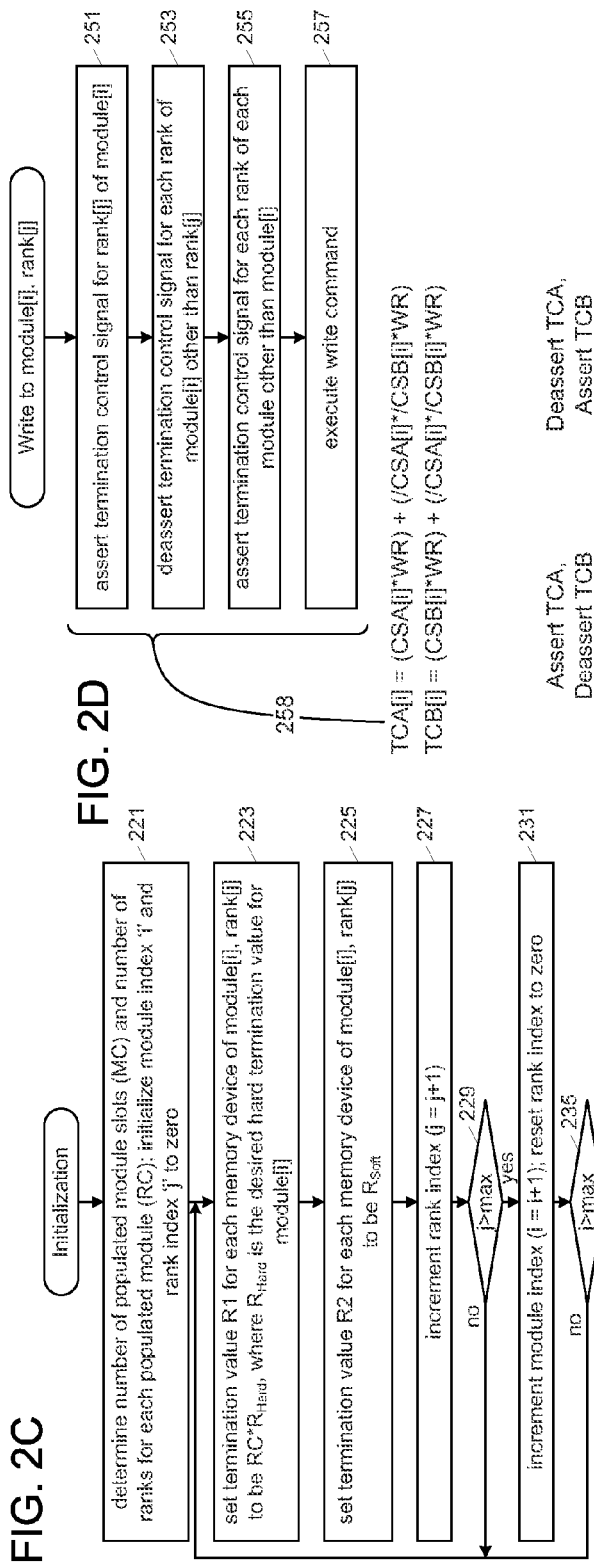

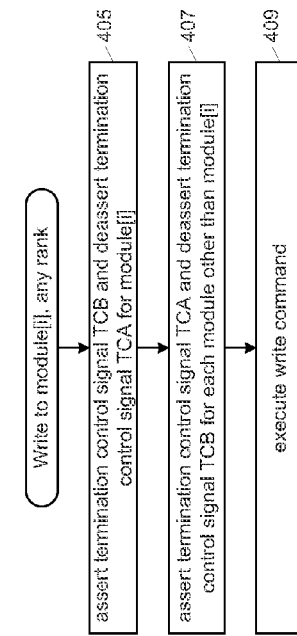
FIG. 4B
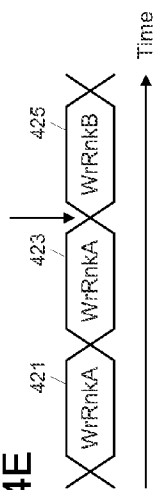
FIG. 4D
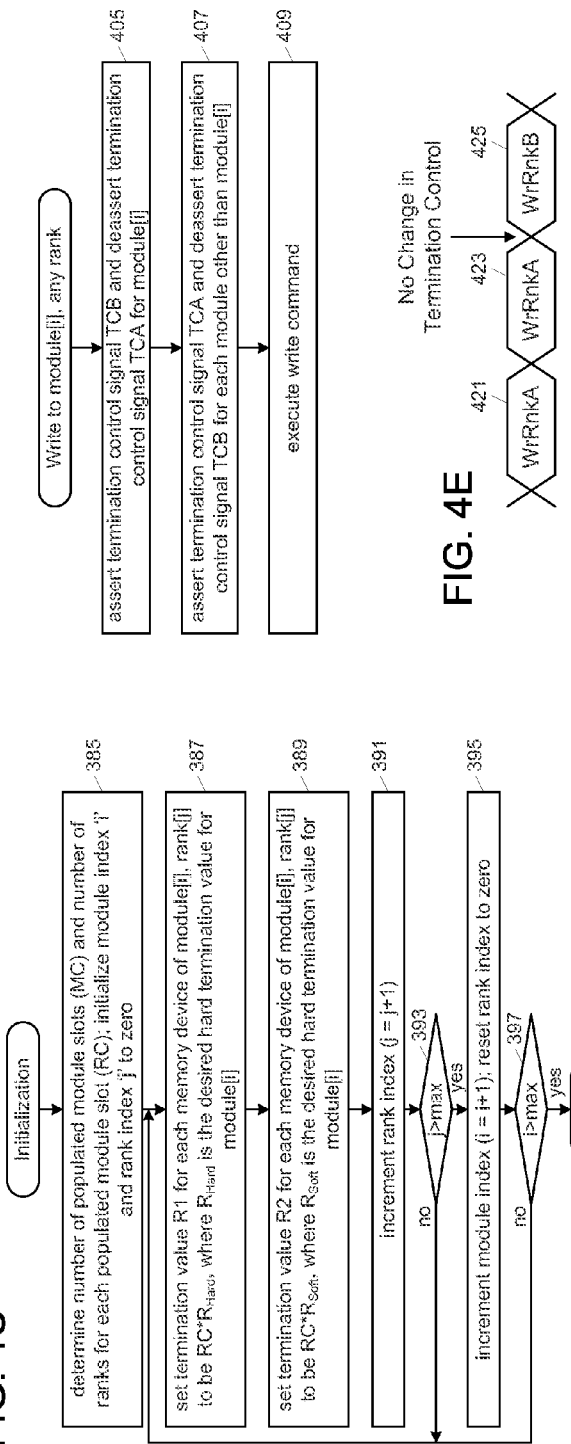
FIG. 4C
FIG. 4E

BALANCED ON-DIE TERMINATION

CROSS-REFERENCE TO RELATED APPLICATIONS

This application hereby claims priority to and incorporates by reference U.S. Provisional Application No. 61/355,673, filed Jun. 17, 2010 and entitled "BALANCED ON-DIE TERMINATION."

TECHNICAL FIELD

The present invention relates generally to the field of electronic communications and more particularly to signaling between integrated circuit devices.

BACKGROUND

On-die termination (ODT) is commonly used to terminate high-speed data links in modern integrated-circuit (IC) memory devices. Unfortunately, the signaling current flows through the IC package inductance (i.e., formed by conductive structures within the IC package such as vias, wire-bonds, etc) before reaching the on-die termination, and thus tends to create data-dependent switching noise that is transferred to the power rails and thus to neighboring signal signaling links, reducing the net signal-to-noise ratio (SNR) within the system.

BRIEF DESCRIPTION OF THE DRAWINGS

The present invention is illustrated by way of example, and not by way of limitation, in the figures of the accompanying drawings and in which like reference numerals refer to similar elements and in which:

FIGS. 2A-2E illustrate an exemplary approach to balanced on-die termination within a memory system having one or more slots (or connectors) for insertion of removable memory modules;

FIG. 4B illustrates an exemplary set of on-die terminations that may be enabled within the dual-rank memory module of FIG. 4A;

FIG. 4C illustrates an exemplary system initialization operation that may be executed by a memory controller to establish the module-balanced termination configuration shown in FIG. 4B;

FIG. 4D illustrates an exemplary write operation that may be executed by the memory controller shown in FIG. 4A following initialization of the termination settings within the memory devices of the inserted memory modules;

FIG. 4E illustrates a sequence of write operations within a memory system in accordance with FIGS. 4A-4D.

DETAILED DESCRIPTION

In various embodiments disclosed herein, termination of a high-speed signaling link is effected by simultaneously engaging on-die termination structures within multiple integrated-circuit memory devices disposed on the same memory module (or other substrate, and/or disposed within the same integrated-circuit package) and coupled to the high-speed signaling link. By enabling on-die termination simultaneously within multiple same-module memory devices, data-dependent switching noise is substantially reduced as the signaling current is split between or among the multiple memory devices and thus flows through a substantially reduced net package inductance. The reduced switching noise improves system power integrity (i.e., reduces noise transference via the power rails), and thus reduces margin-degrading cross-talk and timing jitter, yielding an overall improved signaling margin that may permit faster signaling rates and relaxed system design.

Figure 1:
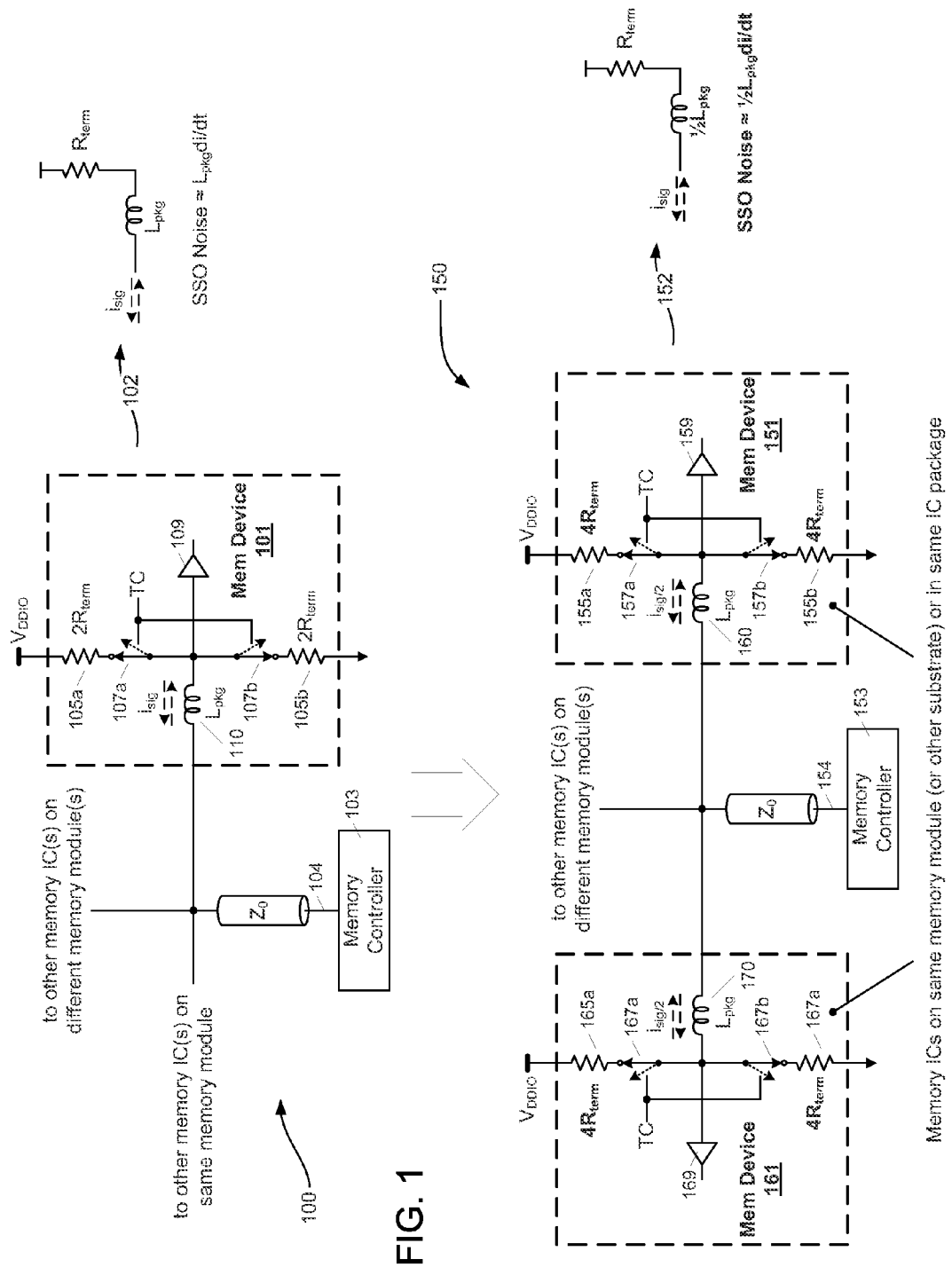
FIG. 1 contrasts a legacy single-device termination mode with an exemplary balanced, multi-device termination mode.

FIG. 1 contrasts a legacy single-device termination mode with an exemplary balanced, multi-device termination mode. In the single-device termination mode, shown generally at 100, on-die termination elements 105a, 105b are engaged (i.e., by operation of switch elements 107a, 107b in response to a termination control signal, TC) within a memory device 101 of a given memory module or other substrate, thereby coupling a net on-die termination load of $R_{term}$ to a signaling link 104 extending between memory controller 103 and memory device 101. Consequently, a signaling current, '$i_{sig}$' flows through the package inductance, $L_{pkg}$ (e.g., parasitic inductance that may result from package-to-memory-module interconnects as well as intra-package wiring structures including traces, vias, die-interconnects, etc.), before flowing through the pull-up and pull-down termination elements 105a, 105b (depicted as $2R_{term}$, but effectively disposed in parallel from a small-signal or AC perspective and thus equivalent to $R_{term}$; i.e., the product $2R_{term}*2R_{term}$ divided by the sum $2R_{term}+2R_{term}$) to develop a detectable signal voltage at the input of receiver 109.

By contrast, in the balanced, multi-device termination mode shown at 150, on-die termination elements 155a, 155b, 165a, 165b are engaged (i.e., coupled via switching elements 157a, 157b, 167a, 167b to an on-die portion of signaling link 154 in response to termination signal(s), TC) in two memory devices 151, 161 of the memory module, with the effective termination load within each memory device having twice the resistance (or impedance) of the desired termination load (i.e., $4R_{term}$ pull-up and $4R_{term}$ pull-down in each memory device and thus an effective resistance of $2R_{term}$ in each memory device) to establish a net desired termination load, $R_{term}$, that is balanced between the two memory devices 151 and 161. Consequently, half of the signaling current, $i_{sig}/2$, flows through the package inductance of each of the two memory devices 151, 161, in effect halving the net package inductance through which the net signal current flows and thus halving the overall data-dependent switching noise produced by the signal termination. That is, because the simultaneous-switching output (SSO) noise is largely or at least partly a function of data-dependent changes in the direction and/or level of the signaling current flowing through the net package inductance (i.e., SSO noise approximated by $L_{pkg}di/dt$), the SSO noise may be effectively halved by the balanced termination approach which halves the net package inductance through which the signaling current flows. This noise reduction may be appreciated by comparing the termination circuit models shown at 102 and 152 for the single-device and multi-device termination modes, respectively. The balanced termination may also reduce signal reflection amplitude relative to conventional termination approaches and thus yield improved timing and voltage margins over and above the benefits resulting from the lowered SSO noise.

As shown, the terminated signaling link 154 may be modeled as a transmission line having characteristic impedance, $Z_O$, and extending at least from memory controller 153 to the memory module on which memory ICs 151 and 161 are disposed. Although not specifically shown, the overall signaling channel between the memory controller and memory ICs 151 and 161 may include numerous such signaling links, each of which may be a bidirectional link (e.g., for conveying read data from memory devices 151, 161 to memory controller 153 and write data from memory controller 153 to the memory devices 151, 161) or a unidirectional link (e.g., for conveying control/address/timing information from the memory controller to the memory devices). In single module-slot embodiment, the memory system has only one memory-module slot (or connector or other structure to permit insertion/removal of a memory module), and thus may be expanded only by replacing an existing memory module with a higher-capacity (and/or higher bandwidth) memory module. In alternative embodiments, the memory system includes multiple memory-module slots, each coupled in parallel to the signaling link at a different point along its length, for example, or in a star configuration. Such multi-slot embodiments are indicated in FIG. 1 by the reference "to other Memory IC(s) on different memory module(s)."

Memory devices 151 and 161 are depicted in FIG. 1 as being disposed (or situated) on the same memory module and, as discussed below, are assumed to be more specifically disposed immediately opposite one another on front and back surfaces of a memory module substrate. Thus, the distance between the commonly coupled input/output nodes of the two memory devices is quite small (i.e., relative to the distance between memory devices disposed on different memory modules) and the physical location of the two devices relative to one another is intended to be unchangeable (i.e., the devices are not intended to be movable relative to one another, in contrast to devices on respective memory modules each of which may be removed and reinserted in different module slots). The two memory devices 151 and 161 may alternatively (or additionally) be secured in fixed, proximal position relative to each other within a common IC package (e.g., the memory devices being respective memory ICs stacked or disposed collaterally within an IC package) or disposed within respective IC packages that are themselves stacked or otherwise affixed proximally to one another. Also, the two memory devices 151 and 161 may be disposed adjacent one another on the same surface or opposite surfaces (i.e., in a clam-shell arrangement with the substrate sandwiched between the two memory devices) of a motherboard, daughterboard (e.g., graphics card, line card, etc.) or any other chip-mounting substrate. More generally, while the balanced termination shown at 150 of FIG. 1 and implementations and alternatives thereof in other embodiments disclosed below are presented primarily with respect to memory devices disposed on the same memory module, the structures and methods disclosed may be employed in virtually any memory device arrangement in which the multiple memory devices (which may be IC dice or respective IC packages) jointly enabled to terminate a given signal line are disposed in sufficiently close proximity that the net inductance of the termination is reduced (and/or other characteristics of the signaling link improved) by the multi-device on-die termination relative to the net inductance (or other signaling link characteristic) of a termination employing only one of the memory devices. For example, the jointly-terminating memory devices may be limited to physical disposition within 5, 10 or 15 millimeters of one another, though smaller or larger distance limits may apply; or limited to a physical interconnection in which the inductance of the trace(s) and/or other interconnection structure(s) coupled between the multiple memory devices is, for example, less than 2, 3, 4 or 5 times the package/die inductance of the memory devices themselves, though larger or smaller inductance ratios may apply. Further, while the termination techniques are described in connection with memory devices (i.e., integrated circuit devices having a substantial array of storage cells for volatile and/or non-volatile storage of data within an electronic system or appliance, including for example and without limitation, static, dynamic and all other forms of random access memory, as well as flash and all forms of non-volatile memory), all such termination techniques may also be employed with respect to other types of integrated circuit devices in which on-die-terminated signaling may be carried out including, without limitation, buffer ICs disposed on a memory module to present a first high-speed signaling interface to a memory controller, and one or more additional signaling interfaces with respect to one or more memory devices or sets of memory devices. In the case of a buffer IC, balanced on-die termination may be effected as between buffer ICs (e.g., in respective memory controller interfaces) and/or between two or more memory devices coupled to a buffer IC via a shared high-speed signaling link. The memory controller itself (e.g., element 153 of FIG. 1) may be implemented as a dedicated-function IC or combined with other functions within an application-specific IC (ASIC), and/or with one or more processing cores in a general-purpose or special-purpose processor.

Although a parallel pull-up and pull-down termination scheme is depicted in FIG. 1 and other embodiments described below, the termination within a given integrated-circuit device may alternatively be effected via pull-up only or pull-down only, which selection may be fixed by design, configured during system production or even configured dynamically during system run-time (e.g., by programming appropriate value(s) into one or more configuration registers). Also, while precisely equal termination impedances are depicted in the balanced on-die termination arrangement shown in FIG. 1 and in embodiments described below, the on-die termination impedances within memory devices enabled to jointly terminate a given signaling link need not be precisely equal and may even be intentionally non-uniform. In one embodiment, for example, non-uniform on-die termination impedances may be applied by two or more memory devices to compensate for differences in the links of stubs attaching the memory devices to the signaling link being terminated. Alternatively, the termination impedances to be applied jointly to a signaling link by two or more memory devices (i.e., as part of a joint or balanced termination) may be tuned to respective, possibly-different values determined during a calibration or other tuning operation to maximize a desired signaling characteristic, such as data eye width and/or height. Accordingly, the term "balanced" is used broadly herein to encompass both uniform and non-uniform termination contributions from multiple integrated-circuit devices disposed, for example, on the same memory module and/or within the same integrated circuit package.

FIGS. 2A-2E illustrate an exemplary approach to balanced on-die termination within a memory system having one or more slots (or connectors) for insertion of removable memory modules. Referring to exemplary module-based memory system 180 of FIG. 2A, each of one or more memory modules 185 is assumed to include at least two ranks of memory devices, rank A and rank B, disposed on respective, opposite faces of a module substrate 186. Each memory device 191 on the module (i.e., the memory devices of both ranks) is coupled to memory controller 181 via a common (i.e., shared) set of module control/address (MCA) links which may include, for example and without limitation, address links (Addr[n−1:0]), command links (Cmd[m−1:0]), and one or more timing related link (e.g., a clock link, Clk, and a clock-enable link, ClkEn). By contrast, the two ranks of memory devices are coupled to respective sets of rank control (RC) links each set of which may include, for example and without limitation, a chip-select link (CSA for the memory devices of rank A, and CSB for the memory devices of rank B) and a termination-control link (TCA for the memory devices of rank A and TCB for the memory devices of rank B). Further, within a given rank, each memory device is coupled to a respective set of bi-directional data links (DQ) and unidirectional data-control links, the latter of which may include, for example and without limitation, one or more data mask links (DM) and one or more data timing links (DQS; e.g., for conveying a strobe signal, clock signal or other timing signal that controls the timing of data link sampling within the data destination). Moreover, each set of data-related links (DQ, DM, DQS) is coupled to a respective memory device within each rank so that, in the depicted two-rank module 185, two memory devices (those disposed directly opposite one another on front and back surfaces of the memory module substrate 186) are coupled in common to each respective set of data-related links.

Each individual signaling link depicted in FIG. 2 may be formed by multiple segments, including without limitation, an on-controller segment extending from termination, reception and/or transmission circuitry within memory controller 181 to an external contact of the memory controller; a controller-to-module segment extending from an external contact of memory controller 181 to a connector contact within at least one of the memory module slots (i.e., Module Slot 1, Module Slot 2, etc.), an on-module segment extending from a connector contact 192 (e.g., disposed at an edge of the memory module to mate to a counterpart contact of the connector) to an external contact of at least one memory device 191 disposed on a memory module inserted within the module slot, and an on-memory segment extending from the external contact of the at least one memory device through package wiring structures (e.g., vias, bond-wires, etc.) to termination, reception and/or transmission circuitry on a memory IC die. The controller-to-module and on-module segments of the signaling link may be formed, for example and without limitation, by conductive traces disposed on surface layers and/or internal layers of printed-circuit board substrates (e.g., substrate 186), vias for intercoupling such traces disposed on different substrate layers, and/or various types of flexible or rigid cables (e.g., polyimide tape having conductive traces formed thereon).

Figure 2A:
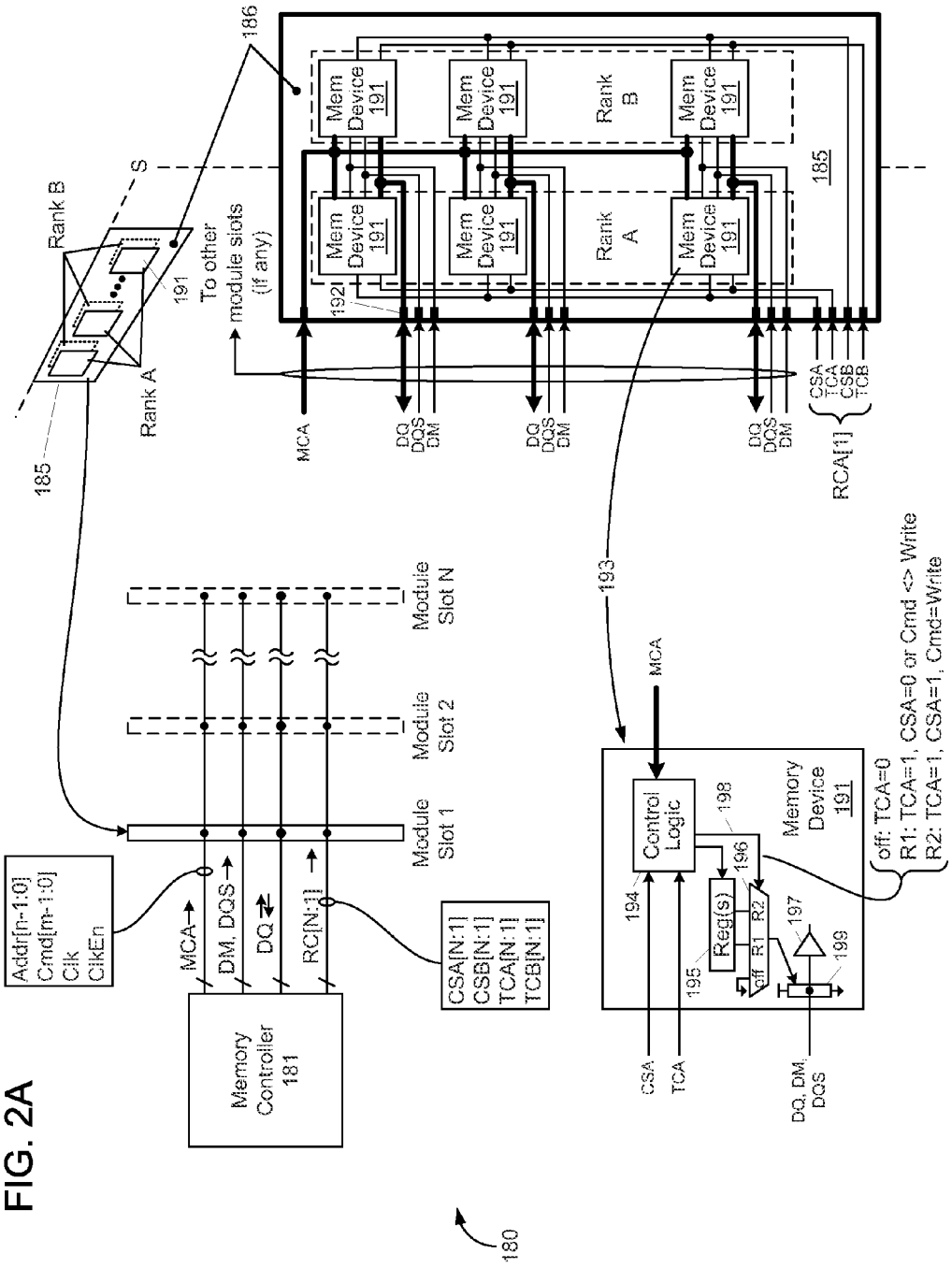

Still referring to FIG. 2A, memory system 180 may include only a single module slot (e.g., "Module Slot 1") or may include additional module slots (e.g., "Module Slot 2". . . "Module Slot N") to permit insertion of one or more additional memory modules. In the latter case (multiple module slots), the module control/address links may be coupled in parallel to the memory devices in all populated module slots, while distinct sets of rank control links may be coupled to respective ranks of memory devices within each of the populated module slots (thus, the overall set of rank control links depicted as CSA[N:1], CSB[N:1], TCA[N:1], TCB[N:1] for exemplary memory system 180 in which each of the N module slots may be populated with a dual-rank memory module 185). Each set of data-related links may be coupled in parallel to a memory device per rank, so that each individual data-related link is coupled to a number of memory devices (N) equal to the total number of ranks in the memory system.

In exemplary memory system 180, memory read and write operations are carried out with respect to all the devices of a selected rank in parallel. That is, memory controller 181 asserts one of N chip-select signals (i.e., one of CSA[N−1:0], to select the devices of rank A on one of N memory modules, or one of CSB[N−1:0] to select the devices of rank B on one of N memory modules) to enable a selected-rank of memory devices 191 to receive a memory access command via the module command/address lines (MCA), and also asserts termination control signals as necessary to establish a desired signaling link termination for the selected rank. In one embodiment, shown in detail view 193, each memory device 191 within a given rank includes a single memory integrated circuit having control logic 194 that responds to incoming termination-control and chip-select signals (TCA and CSA in the example shown as the depicted device is included within memory rank A) by selecting one of three on-die termination states: OFF (i.e., high-impedance or open and thus no termination), R1 (a first termination impedance) or R2 (a second termination impedance). More specifically, if the incoming termination-control signal is in a logic '0' state (i.e., TCA=0, which may be a high or low signal depending on the active logic state), the OFF state is selected and termination is disabled. By contrast, if the termination-control control signal is in a logic '1' state, then termination value R1 is applied if the chip-select signal is in a logic low state (CSA=0) or if the incoming command is not a memory write command (CMD <> Write); or termination value R2 is applied if the chip-select signal is in a logic high state (CSA=1) and the incoming command is a memory write command (CMD=Write). The on-die termination mode selection is depicted conceptually in FIG. 2A by multiplexer 196 and its output selection in response to multiplexer control signal 198 from control logic 194. Other selection circuits may be used in alternative embodiments. Also, as shown, one or more registers 195 may be provided to store the R1 and R2 termination impedance settings, either of which may be disabled (i.e., such that a high impedance is applied). Depending upon the termination mode selection, the appropriate termination setting signals are applied to termination circuit 199 to establish the specified on-die termination at the input of receiver 197. Though not specifically shown, a transmitter (which may include pull-down, pull-up driver elements that form part or all of the termination circuit 199) may also be coupled to the incoming signaling link (e.g., coupled to bidirectional DQ and DQS links) to enable bidirectional signal transmission.

FIG. 2B illustrates an exemplary table 210 of on-die termination settings that may be enabled by the memory controller within the system of FIG. 2A. For purposes of example, the memory system is assumed to be populated with two memory modules (Module 1, Module 2), each of which includes two ranks of memory devices (Rank A, Rank B). As table 210 demonstrates, the memory controller enables different termination settings within the four memory ranks depending on the rank being written to (though not shown, it is assumed that the controller disables on-die termination within all memory ranks during memory read operations). More specifically, in the example shown, it is assumed that a relatively high-impedance on-die termination (i.e., weak termination referred to herein as a "soft" termination) is desired within the memory module containing the rank under write (i.e., the rank selected by assertion of its chip-select signal), and a relatively low-impedance on-die termination (i.e., strong termination referred to herein as a "hard" termination) is desired within the memory module containing the non-selected ranks (i.e., the "non-selected memory module"). In one embodiment, for example, the soft termination is 120 ohms and the hard termination is 40 ohms or 60 ohms, though any other hard and/or soft termination values may be applied, depending on system characteristics.

In an embodiment that enables selection of the R2 termination impedance only in a rank selected for memory write (i.e., individual memory devices are required to register incoming write command in order to select the R2 termination), the R2 termination value may be programmed to match the desired soft termination value ($R_{soft}$), while the R1 termination value is programmed to be twice the desired hard termination value (i.e., $2R_{Hard}$, where $R_{Hard}$ is the desired hard termination). By this operation, the desired hard termination may be effected by enabling balanced on-die termination within each rank of memory devices of the non-selected memory module, while the desired soft termination may be effected by directing a write operation to one of the two ranks of the other memory module. More specifically, as demonstrated by table 210, when writing to Rank A of Module 1, the memory controller asserts the termination control signals to ranks A and B of Module 2, thereby establishing a balanced, parallel on-die termination of $2R_{Hard}$ in each rank, and thus the desired net termination, $R_{Hard}$, for each signal link. As discussed, because the signal current (or termination current) flowing via a given signaling link to the termination elements within the non-selected memory module is split between the two termination-enabled devices, the signal current flows through a net package inductance that is approximately half the inductance that would apply if on-die termination was enabled in only one of the two ranks of the non-selected memory module. In implementations in which each memory device includes appreciable package inductance (e.g., due to presence of package vias and other signal conduction structures), the level of simultaneous switching output (SSO) noise may be substantially reduced, improving system power integrity and thus signaling margins as a whole.

Still referring to table 210 and continuing with the write to Rank A of Module 1, the termination within Rank B of Module 1 (i.e., the non-selected rank) is disabled (e.g., by deassertion of the termination control signal to that rank) as the write to Rank A of Module 1 will enable termination of desired soft termination, $R_{soft}$.

When writing to Rank B of Module 1, balanced on-die termination is enabled within the non-selected memory module (Module 2) as discussed above (i.e., R1 ($2R_{Hard}$) termination enabled in each of the two ranks of the non-selected memory module, thus effecting the desired per-link termination, $R_{Hard}$, but with effectively reduced package inductance), and the termination control signals asserted to Ranks A and B of Module 1 are reversed. That is, the termination-control signal to Rank A is deasserted, while the termination-control signal to Rank B is asserted, thus enabling Rank B to apply the desired soft termination, $R_{soft}$ (R2), in response to registration of the incoming write command.

Continuing with FIG. 2B, termination control during write operations directed to Module 2 Ranks A and B is essentially the same as during the writes to Module 1 Ranks A and B, except that the terminations applied within the two memory modules is reversed. That is, in a write to Module 2, Rank or Rank B, balanced on-die termination $2R_{Hard}$ is enabled within both ranks of Module 1 (thus effecting the desired per-link termination ($R_{Hard}$), but with effectively reduced package inductance), while termination, $R_{soft}$ is enabled only in the rank under write in Module 2 (disabling termination in the non-selected rank of Module 2).

FIG. 2C illustrates an exemplary system initialization operation that may be executed by memory controller 181 of FIG. 2A to establish the termination configuration shown in FIG. 2B, including the balanced on-die termination within a non-selected memory module during memory write. Initially, at 221, the memory controller determines the number of populated module slots (MC) and the number of memory ranks (RC) for each inserted memory module, and also initializes a module index (T) and rank index (T) to zero. Thus, generalizing from the two-module, two-ranks-per-module example of FIG. 2B, the module count may range from one to the number of available module slots in a given system, and the number of ranks included within each memory module may independently vary (i.e., different rank count from one module to the next) and may range from one to any practicable number of memory ranks. Conversely, the module count may be fixed in a given system (and/or the number of ranks per module may be fixed so that all or portion of the operation at 221 may be omitted. In any case, the memory controller may receive information regarding the system configuration (e.g., number of modules, number of ranks included within each module) by querying the module slots, by reading a serial-presence detect (SPD) or other on-module non-module storage element, by receiving the information from other system components (e.g., a processor executing boot-up code or the like), or from any other source.

Continuing with FIG. 2C, at 223, the memory controller sets the termination value R1 for each memory device of module[i], rank[j] to be $RC*R_{Hard}$, where denotes multiplication and 'RC' is the rank count for module[i] and thus the number of memory devices in which on-die termination will be simultaneously enabled to terminate a given signaling link coupled to module[i]. At 225, the memory controller sets termination value R2 for each memory device of module[i], rank[j] to be $R_{soft}$, the desired on-die termination to be applied by a rank under write. In one embodiment, the memory controller sets the termination values, R1 and R2, within a rank of memory devices by issuing one or more register write commands via the module command/address lines, asserting the chip-select signal for the memory rank being programmed (or multiple chip-select signals if multiple ranks are to be programmed in response to a broadcast instruction). The termination-value setting (i.e., pattern of bits representing the impedance to be applied when on-die termination is enabled) may also be transmitted over the module command/address lines or in part or whole via the data-related signaling links (e.g., DQ and/or DM). In any case, the memory devices selected by asserted chip-select signal(s) responds to the register write command by storing the termination-value setting within the specified register(s), thus effecting a register programming operation.

Still referring to FIG. 2C, the rank index is incremented at 227 and then evaluated at 229 to determine whether termination-value settings for the last rank of a given module has been programmed. If the last rank has not yet been programmed, the programming operations at 223 and 225 (i.e., setting termination values R1 and R2) are repeated for the new rank, and then the rank index incremented and evaluated at again at 227 and 229. Upon determining that the last rank for memory module[i] has been programmed (affirmative determination at 229), the module index is incremented at 231 (and rank index reset to zero) and evaluated at 235. If the termination settings for the ranks of the last module have not been programmed (i.e., negative determination at 235), the operations at 223, 225, 227 and 229 are repeated to program the ranks of the next memory module in sequence. Otherwise, if the termination-value settings for the last module have been programmed (affirmative determination at 235), then the initialization of the on-die termination settings within the memory modules is deemed complete.

Still referring to FIG. 2C, it should be noted that a single the termination settings R1 and R2 may be programmed in a single register-write operation, instead of the two operations shown at 223, 225. Also, termination-value settings within the ranks of a given memory module or even within the ranks of multiple memory modules may be programmed via a shared command or set of commands (e.g., a register-write command that is effectively broadcast to multiple ranks through concurrent assertion of multiple chip-select signals), and thus established in fewer programming operations than in the rank-by-rank, module-by-module example shown. More generally, instead of the initialization procedure shown at FIG. 2C or other initialization embodiments shown and described below, the termination configuration may be preset during device and/or system manufacture.

FIG. 2D illustrates an exemplary write operation that may be executed by the memory controller following initialization of the termination settings within the memory devices of the inserted memory modules. At 251, the memory controller asserts the termination control signal for rank[j] of module[i] (i.e., the rank under write) and, at 253, the memory controller deasserts the termination control signal(s) for each rank of module[i] other than rank[j]. At 255, the memory controller asserts the termination control signals for all ranks of each module other than module[i]. By this operation, balanced multi-device on-die terminations are enabled within all multi-rank memory modules except module[i]. When a write command is issued to rank[j] of module[i], as shown at 257 (which may be issued concurrently with, before or after assertion/deassertion of the termination control signals), each of the memory devices of rank[j] will respond by applying on-die termination value, $R_{soft}$, to terminate a respective set of data-related signaling links (e.g., DQ, DM, DQS), thus establishing the termination arrangement shown in FIG. 2B. Other signaling links (e.g., MCA links) may additionally (or alternatively) be terminated by balanced on-die terminations. In terms of Boolean logic, the termination control signals generated by a memory controller within a system populated by dual-rank modules (i.e., as shown in FIG. 2A) may be expressed as shown at 258. That is, the memory controller asserts the termination control signal for memory rank A of a given module (i.e., TCA[i]) if (1) the chip-select signal for that rank is asserted (or is to be asserted) as part of a write operation (i.e., CSA[i] high and a write operation (WR) is signaled, thus indicating a write to rank A of module[i]), or (2) a write operation is signaled, but the chip-select signals for both ranks of the module are low or are to be low (i.e., a write operation directed to another module as shown by /CSA[i]*/CSB[i]*WR, where '/' denotes logical 'NOT' and denotes logical AND). Similarly, the memory controller asserts the termination control signal for memory rank B of a given module (i.e., TCB[i]) if (1) the chip-select signal for that rank is asserted or is to be asserted as part of a write operation (i.e., CSB[i] high and a write operation (WR) is signaled), or (2) a write operation is signaled, but the chip-select signals for both ranks of the module are low (i.e., /CSA[i]*/CSB[i]*WR). Other logical conditions may be employed to determine the states of the termination control signals in alternative embodiments. Also, in the example shown, if the conditions for asserting a termination control signal for a given rank are not met, the memory controller deasserts the termination control signal.

In one embodiment, the memory controller may reset termination control signals to a deasserted state after each write operation. Alternatively, the memory controller may change the state of the termination control signals only when dictated by the incoming command stream. Thus, in a system populated by multiple two-rank memory modules, the memory controller may assert the TCA control signal and deassert the TCB signal for a given memory module during a memory write to rank A of that memory module, and then leave those termination control signal states unchanged (i.e., maintain the termination control signal states) upon determining that the next memory access operation is also a memory write to rank A of the memory module. (Similarly, even if the rank under write within a given module changes from one write operation to the next, the termination control signals applied to the non-selected modules to establish net on-die termination, $R_{Hard}$, may remain unchanged.) If the ensuing memory access operation is to be a write to the rank B of the same memory module, the memory controller may then swap the states of the TCA and TCB signals (asserting TCB and deasserting TCA) to establish the desired termination. This signal state transition is illustrated in the sequence of write operations indicated at 271, 273 and 275 of FIG. 2E, in part to emphasize a distinction with respect alternative embodiments described below.

Figure 3A:
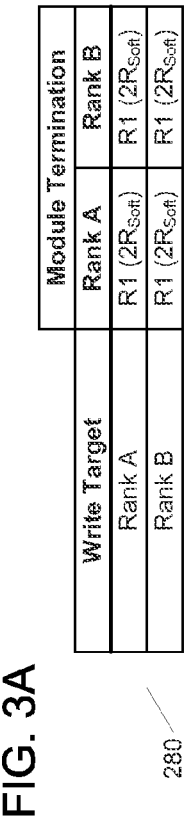
FIGS. 3A-3D illustrate an exemplary approach to balanced termination within a memory system having a solitary memory module slot populated by a multi-rank memory module.

FIGS. 3A-3D illustrate an exemplary approach to balanced termination within a memory system having a solitary memory module slot populated by a multi-rank memory module (e.g., memory system 180 of FIG. 2A limited to a single memory slot). More specifically, FIG. 3A presents a table (280) of balanced termination settings that may be selected by a memory controller (e.g., element 181 of FIG. 2A) when writing to a rank of memory devices within a dual rank memory module. Because the system includes only one memory module, one rank or the other of that memory module will be the write data destination (i.e., rank under write) in all write operations. Accordingly, in on embodiment, a soft termination is established within the memory module by programming the R1 termination setting to be $2*R_{soft}$, where $R_{soft}$ is the desired termination, and by disabling application of termination value R2 (or by setting R2 to also be $2*R_{soft}$). By this operation, a balanced multi-device on-die termination may be established by asserting the termination control signals to both ranks A and B during a write operation such that the signal current flowing via a given signaling link is split between two termination-enabled memory devices in respective ranks and thus flows through a net package inductance that is approximately half the inductance that would apply if the on-die termination was effected in only one of the two ranks of memory devices. In addition to the power integrity benefit discussed above (i.e., SSO noise produced by the data-dependent termination current may be substantially reduced, improving system power integrity and thus signaling margins as a whole), the termination control signals may be maintained without change (and thus avoiding termination switching delay and/or related overhead) as the rank under write is changed from Rank A to Rank B or vice-versa. This is made clear in FIG. 3A by the same-state termination control selection (R1 for both ranks), regardless of the rank under write.

Still referring to FIG. 3A, the soft termination applied in a single-module system may be stronger than the soft termination applied in the multiple-module system described in reference to FIG. 2B. In one embodiment, for example, the soft termination is 40 ohms or 60 ohms (e.g., similar to the hard termination in a multiple-module system) though any other higher or lower soft termination value may be applied.

Figure 3C:
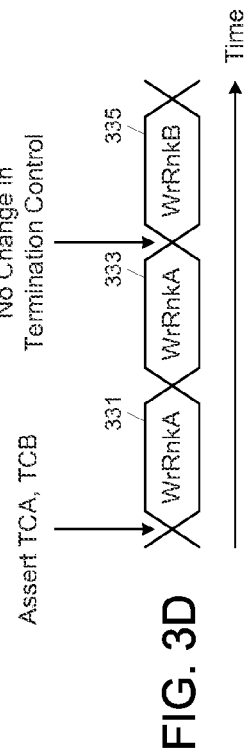
Figure 3B:
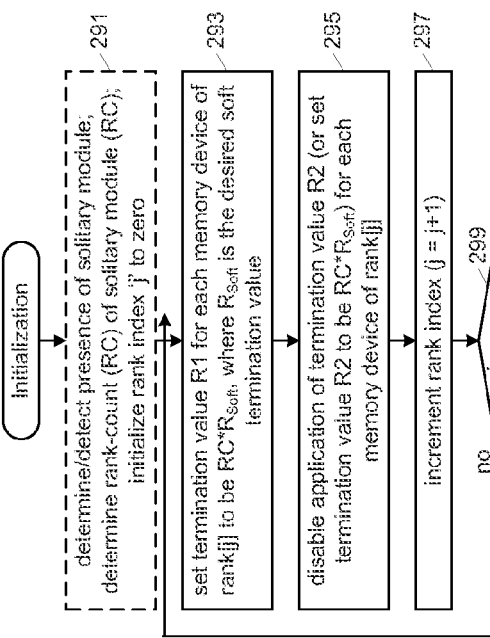

FIG. 3B illustrates an exemplary system initialization operation that may be executed by a memory controller to establish the balanced on-die termination configuration shown in FIG. 3A. Initially, at 291, the memory controller determines (or detects) that a solitary module is present, as well as the number of ranks per module (i.e., two ranks were assumed in connection with FIG. 3A for purposes of example only). As in the initialization operation of FIG. 2C, the memory controller may receive information regarding the system configuration (e.g., solitary module and number of ranks therein) by querying the one or more module slots, by reading an SPD memory or other on-module non-volatile storage element, by receiving the information from other system components, or from any other source. Also, the memory controller may assume a given rank count if fixed within the system. For example, if the memory controller is configured to operate with a dual-rank module in the at least one memory module slot, the memory controller may assume the presence of two memory ranks and proceed from that assumption.

Continuing at operation 293 of FIG. 3B, the memory controller sets the termination value R1 for each memory device of rank[j] to be $RC*R_{soft}$, where denotes multiplication and 'RC' is the rank count and thus the number of memory devices in which on-die termination will be simultaneously enabled to terminate a given signaling link coupled to the module. At 295, the memory controller disables application of termination value R2 (or sets termination value R2 for each memory device of rank[j] to be $RC*R_{soft}$, thus matching the R1 termination value). The memory controller may set the termination value R1 or R2 (including disabling application of termination value R2) within each rank of memory devices by carrying out register programming operations generally as described above in reference to FIG. 2C.

Still referring to FIG. 3B, the rank index is incremented at 297, and then evaluated at 299 to determine whether the last rank has been programmed. If not, the programming operations at 297 and 299 are repeated for the new rank (i.e., indicated by the incremented rank index), and then the rank index incremented and evaluated again at 297 and 299. Upon determining that all ranks have been programmed (affirmative determination at 299), initialization of the on-die termination settings is deemed complete. As discussed in reference to FIG. 2B, the on-die termination settings may be programmed within two or more (or all) of the memory ranks simultaneously, by asserting chip-select signals for multiple (or all ranks) to enable the termination programming commands to be, in effect, broadcast to all devices coupled to the asserted chip-select signals.

FIG. 3C illustrates an exemplary write operation that may be executed by the memory controller following initialization of the termination settings. As shown, the memory controller asserts the termination control signal for rank[j] of the lone installed memory module at 311, thus establishing the termination arrangement shown in FIG. 3A. Accordingly, when a write command is issued to a given rank of memory devices as shown at 313 (which command may be issued concurrently with, before or after assertion of the termination control signals), the signaling current used to convey data, data mask and/or data timing signals, at least (and possibly other signals such as those conveyed on MCA links), will be split among the memory devices of respective memory ranks. That is, each signaling link will be terminated by the same effective termination ($R_{soft}$ in this example), but with the net SSO noise reduced according to the number of ranks of memory devices participating in the balanced on-die termination (i.e., reduced by a factor of approximately 1/RC).

Figure 3D:
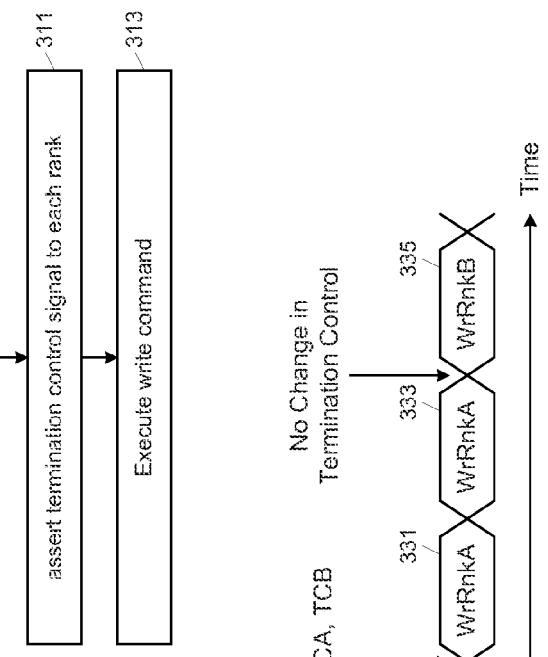

FIG. 3D illustrates an exemplary sequence of back-to-back write operations 331, 333, 335 within the single module system described in reference to FIGS. 3A-3C, emphasizing that termination control signals need not be altered when switching the write data destination from one memory rank to the other. As discussed, this may reduce overall system latency in back-to-back write operations directed to different ranks of the memory module as no termination control signal settings need be changed.

Returning briefly to FIG. 3A, it can be seen that both ranks of memory devices apply the same termination value, regardless of which rank is under write. More generally, in a module having RC ranks, all ranks apply may enable and disable on-die terminations and apply the same on-die terminations in lock step. Accordingly, in one embodiment, a multi-rank memory module has a solitary termination control input that is coupled in common to the termination control inputs of all the memory devices of the memory module (in contrast to the multiple termination control inputs coupled to the memory devices of respective ranks in the exemplary memory module 185 of FIG. 2A). Moreover, in the larger system, only one termination control link need be routed to the memory module (or memory module slot) and only one termination control output need be provided within the memory controller IC to control termination settings on the memory module.

Figure 4A:
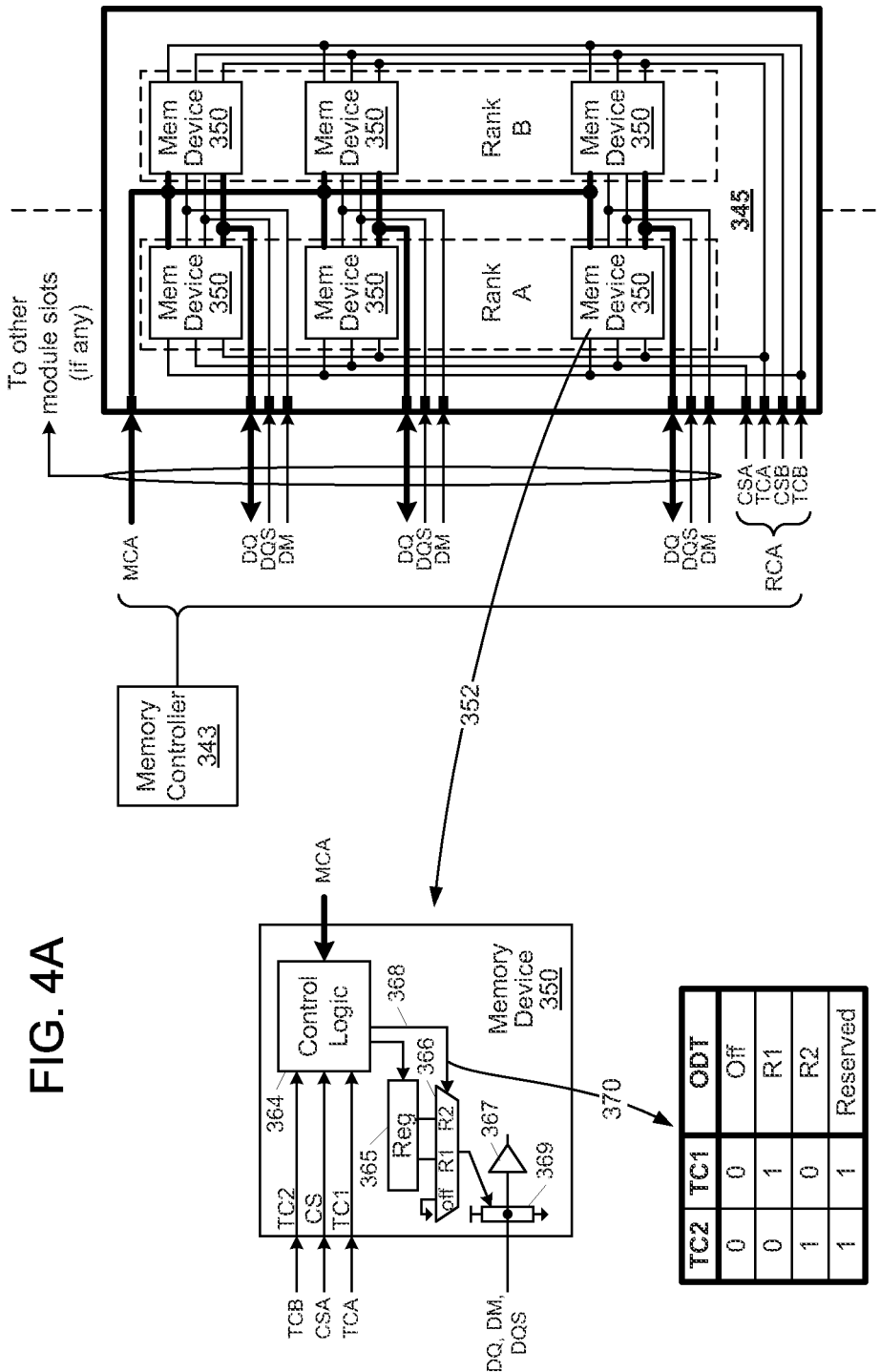
FIG. 4A illustrates an embodiment of a multi-rank memory module capable of applying balanced on-die termination during a memory write operation regardless of whether the module contains the rank of memory devices being written.

FIG. 4A illustrates an embodiment of a multi-rank memory module 345 capable of applying balanced on-die termination during a memory write operation regardless of whether the module contains the rank under write and thus regardless of the number of memory modules in the system (i.e., in contrast to the exemplary termination configuration shown in FIG. 2B in which balanced on-die termination is applied only within non-selected memory modules). As shown, the memory module may be coupled to a memory controller 343 via exactly the same set of signaling links (MCA, DQ, DQS, DM and RCA) as between memory module 185 and memory controller 181 of FIG. 2A and thus may be entirely pin-compatible with that memory module. Moreover, the incoming signal links may be routed to individual memory devices 350 in essentially the same manner as shown in FIG. 2A, except that each of the two termination control links, TCA, TCB, are coupled to each memory device in each memory rank (instead of to memory devices in respective ranks). Accordingly, as shown in detail view 352, each memory device 350 includes two termination control inputs, TC1 and TC2, coupled respectively to receive the TCA and TCB termination control signals and control logic 364 that selects one of at least three on-die termination settings, OFF, R1 and R2, according to which of the four possible termination control states is signaled by the termination control signals (one of the four states being reserved, for example, for a fourth on-die termination setting). More specifically, the control logic disables on-die termination (i.e., de-coupling the on-die termination circuit 369 from the signal link and thus presenting a high-impedance state to the signal link) if the termination control signals at both inputs are low (i.e., TC1=TC2=0), and otherwise enables either termination values R1 or R2 to be applied as the on-die termination circuit 369 according to which of the two termination control signals is raised. As mentioned, the termination setting to be applied if both termination control signals are high (i.e., TC1=TC2='1') is reserved, for example, for a third termination resistance (which itself may be dynamically triggered, for example, by assertion of a chip-select signal at input CS and/or registration of one or more particular commands). Moreover, one or more additional termination control signals may be provided to each memory device (and provided to and routed on board the memory module 345) to permit selection of yet other termination settings.

The on-die termination mode selection is depicted conceptually in FIG. 4A by multiplexer 366 and its output selection in response to multiplexer control signal 368 from control logic 364. Other selection circuits may be used in alternative embodiments. Also, as shown, one or more registers 365 may be provided to store the R1 and R2 termination impedance settings, either of which may be disabled (i.e., such that a high impedance is applied). Depending upon the termination mode selection, the appropriate termination setting signals are applied to termination circuit 369 to establish the specified on-die termination at the input of receiver 367. Though not specifically shown, a transmitter (which may include pull-down, pull-up driver elements that form part or all of the termination circuit 199) may also be coupled to the incoming signaling link (e.g., coupled to bidirectional DQ and DQS links) to enable bidirectional signal transmission.

FIG. 4B illustrates an exemplary set of on-die terminations that may be enabled within the dual-rank memory module 345 of FIG. 4A by memory controller 343. As shown, the memory controller enables different termination settings within the four memory ranks, depending on the rank being written to (though not shown, it is assumed that the memory controller disables on-die termination within all memory ranks during memory read operations). More specifically, in the example shown, it is assumed that a soft termination is desired within the memory module containing the rank under write, and a hard termination is desired within the non-selected memory module. Further, in contrast to the embodiment of FIG. 2B in which balanced on-die termination is applied only in the non-selected memory module, balanced on-die terminations are applied in all memory modules, including the memory module containing the rank under write. This operation is made possible, at least in part, by the provision of multi-bit, chip-select-independent, multi-bit termination control within each of the memory devices as detailed in reference to FIG. 4A. That is, because at least three different on-die termination states (OFF, R1, R2) may be established even within memory devices not selected by assertion of a chip-select signal (i.e., within non-selected ranks), it becomes possible for the memory controller to specify either hard or soft on-die termination states (in addition to disabling on-die termination altogether) in all ranks of memory devices, thereby permitting soft on-die termination to be balanced (or distributed or shared) between or among multiple ranks (or all ranks) within the module containing the rank under write. Referring specifically to the table of FIG. 4B, during a write to Rank A of Module 1, the memory controller establishes soft, balanced on-die termination $R_{soft}$ within the memory module containing the rank under write by enabling the R2 on-die termination state within each rank of Module 1. Because there are two ranks in this example, the R2 termination value within each rank has been programmed to $2R_{soft}$, thereby yielding a net termination impedance of $R_{soft}$ with respect to a given signaling link when both on-die terminations (i.e., within the memory devices of Rank A and the memory devices of Rank B) are enabled. As in the embodiment of FIG. 2B, the memory controller establishes hard, balanced on-die termination within each of the non-selected memory modules by enabling the R1 on-die termination state within each rank of each non-selected module (Module 2 in this first example). Again, because there are two ranks in this example, the R1 termination value within each rank has been programmed to $2R_{Hard}$, thereby yielding a net termination of $R_{Hard}$ with respect to a given signaling link when both on-die terminations are enabled.

In one embodiment, the net soft termination, $R_{soft}$, may be, for example, 120 ohms and thus in a two-rank memory module, a memory device from each rank may be enabled to switchably couple a 240-ohm termination load to a given signaling link to establish the desired soft termination. In such an embodiment, the net hard termination, $R_{Hard}$, may be, for example, 40 ohms or 60 ohms, and thus in a two-rank memory module, a memory device from each rank may be enabled to switchably couple an 80-ohm or 120-ohm termination load to a given signaling link to establish the desired hard termination. The foregoing impedance values are provided for example only, and may vary in alternative embodiments and in accordance with system characteristics.

Continuing with FIG. 4B, it can be seen that the termination configuration remains unchanged when the rank under write (or write target) changes from Rank A of a given memory module to Rank B of that same module. When the rank under write changes from Module 1 to Module 2, the soft and hard balanced on-die terminations are switched between the two modules, but are otherwise effected in the manner described above (i.e., soft terminations of $2R_{soft}$ enabled within each rank of Module 2 and hard terminations of $2R_{Hard}$ enabled within each rank of Module 1).

FIG. 4C illustrates an exemplary system initialization operation that may be executed by a memory controller to establish the module-balanced termination configuration shown in FIG. 4B. Initially, at 385, the memory controller determines the number of populated module slots (MC) and the number of memory ranks (RC) for each inserted memory module, and also initializes a module index (T) and rank index (T) to zero. Thus, generalizing from the two-module, two-ranks-per-module example of FIG. 4B, the module count may range from one to the number of available module slots in a given system, and the number of ranks included within each memory module may independently vary (i.e., different rank count from one module to the next) and may range from one to any practicable number of memory ranks. Conversely, the module count may be fixed in a given system and/or the number of ranks per module may be fixed so that all or portion of the operation at 385 may be omitted. In any case, the memory controller may receive information regarding the system configuration (e.g., number of modules, number of ranks included within each module), by querying the module slots, by reading a serial-presence detect (SPD) or other on-module storage element, by receiving the information from other system components (e.g., a processor executing boot-up code or the like), or by obtaining such information in any other way.

Continuing with FIG. 4C, at 387, the memory controller sets the termination value R1 for each memory device of module[i], rank[j] to be $RC*R_{Hard}$ and at 389 the memory controller sets the termination value R2 for each memory device of module[i], rank[j] to be $RC*R_{soft}$, where denotes multiplication and 'RC' is the rank count for module[i] and thus the number of memory devices in which on-die termination will be simultaneously enabled to terminate a given signal link coupled to the module. As discussed, the memory controller may set the termination values, R1 and R2, within a rank of memory devices by issuing one or more register-write commands via the module command/address lines, asserting the chip-select signal for the memory rank being programmed (or multiple chip-select signals if multiple ranks are to be programmed in response to a broadcast instruction). The termination value setting (i.e., pattern of bits representing the impedance to be applied when on-die termination is enabled) may also be transmitted over the module command/address lines or in part or whole via the data links (e.g., DQ and/or DM). In any case, the memory devices selected by asserted chip-select signal(s) responds to the register-write command by storing the termination-value setting within the specified register(s), thus effecting a register programming operation.

Still referring to FIG. 4C, the rank index is incremented at 391, and then evaluated at 393 to determine whether the last rank of a given module has been programmed. If the last rank has not yet been programmed, the programming operations (i.e., setting termination values R1 and R2) are repeated for the new rank, and then the rank index incremented and evaluated at again at 391 and 393. Upon determining that the last rank for memory module[i] has been programmed (affirmative determination at 393), the module index is incremented at 395 (and rank index reset to zero) and evaluated at 397. If the termination settings for the ranks of the last module have not been programmed, the operations at 387, 389, 391 and 393 are repeated to program the ranks of the next memory module in sequence. Otherwise, if the last module has been programmed (affirmative determination at 397), then the initialization of the on-die termination settings within the memory modules is deemed complete.

As discussed in connection with FIG. 2C, the termination settings R1 and R2 may be programmed in a single register-write operation, instead of the two operations shown (387 and 389). Also, termination settings within the ranks of a given memory module or even within the ranks of multiple memory modules may be programmed simultaneously via a shared command or set of commands (e.g., a register-write command that is effectively broadcast to multiple ranks through concurrent assertion of multiple chip-select signals), and thus established in fewer programming operations than in the rank-by-rank, module-by-module example shown.

FIG. 4D illustrates an exemplary write operation that may be executed by the memory controller shown in FIG. 4A following initialization of the termination settings within the memory devices of the inserted memory modules. At 405, the memory controller asserts termination control signal TCB and deasserts termination control signal TCA for module[i] (i.e., the memory module containing the rank under write), and at 407, the memory controller asserts termination control signal TCA and deasserts termination control signal TCB for each module other than module[i] (i.e., each non-selected memory module). By this operation, balanced multi-device on-die terminations are enabled within all memory modules, with a net on-die termination impedance of $R_{soft}$ applied within the module containing the rank under write, and a net on-die termination impedance of $R_{Hard}$ applied within each non-selected module. Accordingly, when a write command is executed as shown at 409, the data-related links are terminated by a soft termination impedance in the module containing the rank under write, and by a hard termination impedance in each of the other modules. Other signaling links (e.g., MCA links) may additionally (or alternatively) be terminated by balanced on-die terminations. Also, while a sequence of operations (405, 407, 409) is shown in FIG. 4D, each of the operations may be carried out concurrently (i.e., at least partly overlapping in time) or in any order. For example, the states of the TCA and TCB signals for each memory module may be established simultaneously by the memory controller. Also, the memory controller may output the memory write command before, simultaneously with, or after setting the states of the termination control signals.

As discussed above, the memory controller may either reset termination control signals to a deasserted state after each write operation or change the state of the termination control signals only when dictated by the incoming command stream. Thus, in a system populated by multiple two-rank memory modules, the memory controller may establish a termination configuration in accordance with FIG. 4B (i.e., by setting termination states of signals TCA, TCB) during a write to a rank of a given memory module, and then leave those termination settings unchanged upon determining that the next memory access operation is directed to a rank within the same memory module (i.e., whether the same or a different rank on that memory module). If, following a write to rank A of a given module, for example, the ensuing memory access operation is to be a write to the rank B of the same memory module, the memory controller may maintain the states of the termination control signals as shown by the sequence of back-to-back write operations 421, 423, 425 (writing to rank A, rank A and then rank B of a given module) in FIG. 4E, thereby avoiding overhead (e.g., latency) that may otherwise be incurred to establish a revised on-die termination configuration.

Figure 5:
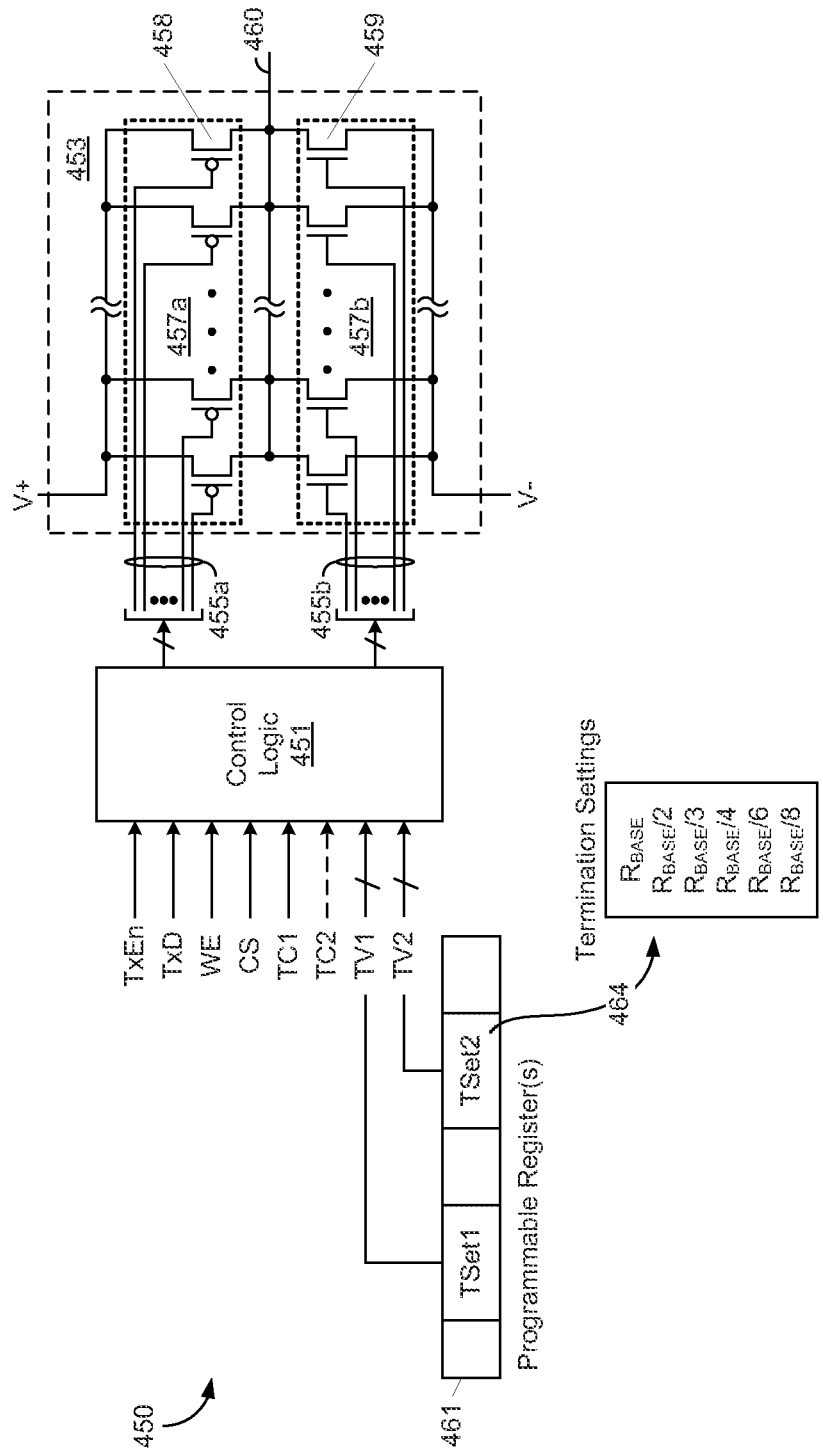
FIG. 5 illustrates an embodiment of a termination/driver circuit that may be used to implement on-die termination circuits described in reference to FIGS. 2A and 4A.

FIG. 5 illustrates an embodiment of a termination/driver circuit 450 that may be used to implement on-die termination circuits described above (e.g., termination circuit 199 of FIG. 2A and/or termination circuit 369 of FIG. 4A). As shown, termination/driver circuit 450 includes control logic 451 and link-loading circuit 453 that may serve alternatively as an on-die termination circuit during signal reception and as a signal output driver during signal transmission. The control logic 451 may be included within the control logic elements depicted in FIGS. 2A and 4A (i.e., elements 194 and 364) and in the embodiment depicted receives a transmit-enable signal, T×En, transmit-data signal, T×D, write-enable signal, WE, chip-select signal, CS, one or more termination control signals, TC1 (and optionally TC2), and termination-value settings, TV1 and TV2. If coupled to a receive-only (unidirectional) signaling link, the transmit-enable and transmit-data signals need not be provided to the control logic (in which case the circuit 450 may serve exclusively as an on-die termination circuit). Also, if termination/driver circuit 450 is to apply a termination load without regard to the state of the chip-select signal or write-enable signal (e.g., and instead based exclusively on the termination control signals), the chip-select and write-enable signals also need not be provided to control logic 451.

Termination/driver circuit 450 performs the role of a push-pull output driver of when the transmit-enable signal, T×En, is asserted, and switches to an on-die termination function when the transmit-enable signal is deasserted. More specifically, when the transmit-enable signal is asserted, the control circuit selectively enables switching elements within pull-up and pull-down switch banks (457a and 457b) in accordance with the transmit data state (T×D) to establish a desired output signal representative of the transmit data (sourcing or sinking current and thus enabling a signaling current to flow via link input/output (I/O) node 460). When the transmit-enable signal is deasserted, the control circuit selectively enables switching elements within the same pull-up and pull-down switch banks in accordance with the termination control signal(s), termination-value signals and, optionally, the state of the chip-select and write-enable signals, to switchably couple a desired on-die termination load to link I/O node 460.

In the particular embodiment shown, switch bank 457a is implemented by a set of P-MOS (P-type metal-oxide-semiconductor) transistors 458 coupled in parallel between link I/O node 460 and the upper supply voltage, V+ (e.g., $V_{DD}$ or $V_{DDIO}$), while switch bank 457b is implemented by a counterpart set of N-MOS (N-type MOS) transistors 459 coupled in parallel between link I/O node 460 and a lower supply voltage, V− (e.g., Ground or $V_{SS}$ or $V_{SSIO}$). The gates of the P-MOS transistors and N-MOS transistors are controlled by respective enable signals asserted and deasserted on enable-signal lines 455a, 455b by control logic 451, thus enabling a desired combination of N-MOS and/or P-MOS transistors to be switched to a conducting state (or partially conducting state) and thus establish a desired transmit and/or termination state within the transmit/termination circuit. More specifically, the number of P-MOS transistors switched to a conducting state controls the effective load between the upper supply voltage, V+, and link I/O node 460, so that, if a current-sourcing transmit state is required (e.g., TxEn=1,TxD=1), a predetermined number the P-MOS transistors within switch bank 457a may be switched to a conducting state to effect a low or negligible impedance between the upper signaling supply voltage node and the signal I/O node, while all N-MOS transistors within switch bank 457b are concurrently switched to a non-conducting state to decouple the lower signaling supply voltage node from the signal I/O node. Conversely, if a current-sinking transmit state is required (e.g., TxEn=1, TxD=0), a predetermined number of the N-MOS transistors may be switched to a conducting state and all the P-MOS transistors may be switched to a non-conducting state. The precise number of N-MOS and P-MOS transistors switched on to establish a given output signal may be fixed, or may be calibrated during system production or system run-time. In the case of calibration, on-chip programmable register(s) 461 (e.g., corresponding to register 195 of FIG. 2A or register 365 of FIG. 4A) may include fields to store values that control which and/or how many of the transistors within a given switch bank 457a, 457b are to be enabled during data transmission, thus permitting signal drive strength to be adjusted in run-time calibration operations.

If a non-transmitting mode is signaled (e.g., TxEn=0), but other incoming control signals (TC1, TC2, CS and/or WE) indicate that on-die termination is to be enabled, control logic 451 transitions to a termination mode by switching a subset of the NMOS transistors 459 within switch bank 457b and a subset of the P-MOS transistors 458 within switch bank 457a to a conducting state (or to a partially conducting state) to establish a desired on-die termination impedance. In one embodiment, the subsets of N-MOS transistors and P-MOS transistors switched on during the termination mode is controlled by one of the termination-value settings, TV1 and TV2, provided to the control logic 451 and thus by one of the two termination settings (TSet1, TSet2) programmed within register(s) 461. In an embodiment according to FIG. 2A, for example, termination-value setting TV1 is used to selectively switch on transistors within switch banks 457a/457b if the termination control signal TC1 (TC2 may be omitted) is asserted and either the chip-select signal (CS) or the write-enable signal (WE) is deasserted (i.e., termination control signal asserted, but no write operation directed to the memory device). In such an embodiment, termination-value setting TV2 may be used to selectively switch on transistors within switch banks 457a/457b if the termination control signal, chip-select signal and write-enable signal are all asserted (and if the alternate-termination-under write is enabled within the mode register(s)), thereby enabling an alternate on-die termination value to be applied when a write operation is directed to the memory device. If the termination control signal is deasserted, then on-die termination mode may be disabled (e.g., the OFF state discussed above) as, for example, during memory read operations.

In a memory device embodiment according to FIG. 4A, termination-value settings TV1 and TV2 may alternately be selected to control the on-die termination value (i.e., selectively switch on respective combinations of transistors within switch banks 457a/457b) according to the states of termination control signals TC1 and TC2. For example, if TC1 is high and TC2 low, TV1 may be selected to control the on-die termination, and if the states are reversed (TC2 high, TC1 low), TV2 may be selected to control the on-die termination. If neither of the termination control signals is high, on-die termination may be disabled.

In one embodiment, the termination settings, TC1 and TC2 (i.e., corresponding to termination-value settings TV1 and TV2), may be programmed to be any of a base termination and scaled versions of the base termination as shown at 464 (e.g., base termination $R_{BASE}$ and scaled terminations $R_{BASE}/2$, $R_{BASE}/3$, $R_{BASE}/4$, $R_{BASE}/6$, $R_{BASE}/8$, etc.). As an example, the base termination may be established by turning on a single P-MOS transistor within switch bank 457a and a single N-MOS transistor within switch bank 457b, with each scaled version of the base termination established by turning on a scaled number of P-MOS and N-MOS transistors (at least in terms of the effective transistor width effected by the multiple switched-on transistors). Thus, $R_{BASE}/2$ may be effected by switching on two transistors in each of banks 457a and 457b, $R_{BASE}/3$ may be effected by switching on three transistors in each of banks 457a and 457b, and so forth. Additionally, any or all of the available terminations may be calibrated, for example, by reference to an internal and/or external resistive element (e.g., a precision resistor), in which case, incremental adjustments may be achieved through the precise number of transistors enabled (e.g., a given transistor shown within switch bank 457a or 457b may be implemented by multiple parallel transistors controlled in part by a common one of enable-signal lines 455a/455b and in part by respective calibration bits, in effect enabling the number of engage-able parallel transistors to be modulated by the calibration bits).

Still referring to FIG. 5, more or fewer termination settings than shown at 464 may be applied in alternative embodiments, with different or additional factors applied to determine the strength of the termination. Also, either or both of the termination settings TSet1 and TSet2 may be restricted to a subset of the complete set of termination settings. The precise termination value to be applied under a given state of the signaling system may be established by selection of one of a fixed number of permissible enable-signal combinations, or through production-time or run-time testing (calibration). For example, one of a fixed number of termination settings may be determined during production-time or run-time (or pre-selected) and programmed within one or more other fields of registers 461 by a control device such as a programmed-processor. Alternatively, a signal quality metric may be evaluated for different termination settings to enable identification and selection of termination setting(s) that yield a maximized (or near-maximized) value of the metric. Further, though the individual transistors (or other switching elements) within either one of switch banks 457a or 457b are depicted as being identical, the transistors controlled by respective enable-signal lines 375a, 375b may be differently sized (e.g., having differently-sized footprints and/or formed by different numbers of ganged transistors having commonly coupled gates) to establish a set of weighted switching transistors. For example a set of N binary-weighted switching transistors (the smallest having unit size 'x', followed by transistors having sizes 2x, 4x, 8x, . . . , $2^{N-1}x$) may be provided and controlled by respective enable-signals to enable selection of $2^N-1$ different impedance settings.

It should be noted that the various circuits disclosed herein may be described using computer aided design tools and expressed (or represented), as data and/or instructions embodied in various computer-readable media, in terms of their behavioral, register transfer, logic component, transistor, layout geometries, and/or other characteristics. Formats of files and other objects in which such circuit expressions may be implemented include, but are not limited to, formats supporting behavioral languages such as C, Verilog, and VHDL, formats supporting register level description languages like RTL, and formats supporting geometry description languages such as GDSII, GDSIII, GDSIV, CIF, MEBES and any other suitable formats and languages. Computer-readable media in which such formatted data and/or instructions may be embodied include, but are not limited to, computer storage media in various forms (e.g., optical, magnetic or semiconductor storage media, whether independently distributed in that manner, or stored "in situ" in an operating system).

When received within a computer system via one or more computer-readable media, such data and/or instruction-based expressions of the above described circuits may be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image may thereafter be used in device fabrication, for example, by enabling generation of one or more masks that are used to form various components of the circuits in a device fabrication process.

In the foregoing description and in the accompanying drawings, specific terminology and drawing symbols have been set forth to provide a thorough understanding of the present invention. In some instances, the terminology and symbols may imply specific details that are not required to practice the invention. For example, any of the specific numbers of bits, signal path widths, signaling or operating frequencies, component circuits or devices and the like may be different from those described above in alternative embodiments. In other instances, well-known circuits and devices are shown in block diagram form to avoid obscuring the present invention unnecessarily. Additionally, links or other interconnection between integrated circuit devices or internal circuit elements or blocks may be shown as buses or as single signal lines. Each of the buses may alternatively be a single signal line, and each of the single signal lines may alternatively be buses. Signals and signaling links, however shown or described, may be single-ended or differential. A signal driving circuit is said to "output" a signal to a signal receiving circuit when the signal driving circuit asserts (or deasserts, if explicitly stated or indicated by context) the signal on a signal line coupled between the signal driving and signal receiving circuits. The expression "timing signal" is used herein to refer to a signal that controls the timing of one or more actions within an integrated circuit device and includes clock signals, strobe signals and the like. "Clock signal" is used herein to refer to a periodic timing signal used to coordinate actions between circuits on one or more integrated circuit devices. "Strobe signal" is used herein to refer to a timing signal that transitions to mark the presence of data at the input to a device or circuit being strobed and thus that may exhibit periodicity during a burst data transmission, but otherwise (except for transition away from a parked condition or other limited pre-amble or post-amble transition) remains in a steady-state in the absence of data transmission. The term "coupled" is used herein to express a direct connection as well as a connection through one or more intervening circuits or structures. Integrated circuit device "programming" may include, for example and without limitation, loading a control value into a register or other storage circuit within the device in response to a host instruction and thus controlling an operational aspect of the device, establishing a device configuration or controlling an operational aspect of the device through a one-time programming operation (e.g., blowing fuses within a configuration circuit during device production), and/or connecting one or more selected pins or other contact structures of the device to reference voltage lines (also referred to as strapping) to establish a particular device configuration or operation aspect of the device. The terms "exemplary" and "embodiment" are used to express an example, not a preference or requirement.

While the invention has been described with reference to specific embodiments thereof, it will be evident that various modifications and changes may be made thereto without departing from the broader spirit and scope. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

What is claimed is:

1. A method of controlling memory devices including first and second memory devices disposed on a first memory module and coupled in common to a signaling link, the method comprising:
    enabling the first memory device to switchably couple a first termination load to the signaling link;
    enabling the second memory device to switchably couple a second termination load to the signaling link concurrently with enabling the first memory device to switchably couple the first termination load to the signaling link;
    outputting a first memory write command via one or more command signaling links coupled in common to the first and second memory devices;
    outputting a write data value via the signaling link during an interval in which the first and second memory devices are enabled to couple the first and second termination loads to the signaling link; and
    concurrently with enabling the first and second memory devices to couple the first and second termination loads to the signaling link, outputting first a d second chip-select signals in respective states to enable the first memory device, but not the second memory device, to store the write data value in response to the first memory write command.

2. The method of claim 1 further comprising enabling a first signaling current to flow via the signaling link while the first and second termination loads are coupled to the signaling link, and wherein a first portion of the signaling current flows through the first termination load and a second portion of the signaling current flows through the second termination load.

3. The method of claim 2 wherein the first and second portions are substantially equal.

4. The method of claim 1 wherein enabling the first memory device to switchably couple a first termination load to the signaling link comprises asserting a first termination control signal that is coupled to the first memory device but not to the second memory device, and wherein enabling the second memory device to switchably coupled a second termination load to the signaling link comprises asserting a second termination control signal that is coupled to the second memory device but not to the first memory device.

5. The method of claim 1 wherein enabling the first memory device to switchably couple a first termination load to the signaling link and wherein enabling the second memory device to switchably couple a second termination load to the signaling link comprises outputting first and second termination control signals in a predetermine state to each of the first memory device and the second memory device.

6. The method of claim 1 wherein the first termination load and the second termination load are substantially equal.

7. The method of claim 1 wherein outputting the first and second chip-select signals in respective states comprises outputting the first chip-select signal via a first chip-select link coupled to the first memory device but not to the second memory device and outputting the second chip-select signal via a second chip-select link coupled to the first memory device but not to the second memory device.

8. The method of claim 1 wherein the first memory module comprises a module substrate and contacts to enable removable insertion of the first memory module into a connector.

9. The method of claim 1 wherein the signaling link is additionally coupled to a third memory device disposed on a second memory module, the method further comprising:
outputting a second memory write command to the third memory device; and
outputting a write data value to the third memory device via the signaling link concurrently with enabling the first and second memory devices to couple the first and second termination loads to the signaling link, the third memory device to store the write data value in response to the second memory write command.

10. The method of claim 1 wherein third and fourth memory devices, disposed a second memory module, are coupled to the signaling link, the method further comprising:
enabling the third memory device to switchably couple a third termination load to the signaling link concurrently with enabling the first and second memory devices to switchably couple the first and second termination loads, respectively, to the signaling link; and
enabling the fourth memory device to switchably couple a fourth termination load to the signaling link concurrently with enabling the first, second and third memory devices to switchably couple the first, second and third termination loads, respectively, to the signaling link.

11. The method of claim 10 wherein the first termination load is configured to be substantially equal to the second termination load and the third termination load is configured to be substantially equal to the fourth termination load, but the first termination load is configured to be substantially different from the third termination load.

12. The method of claim 1 further comprising outputting one or more commands to the first and second memory devices to program registers therein with first and second values that control impedances of the first and second termination loads, respectively.

13. A memory module comprising:
a first plurality of memory devices;
a second plurality of memory devices;
first and second chip-select inputs to receive first and second chip-select signals, the first chip-select input being coupled to each memory device of the first plurality of memory devices and the second chip-select input being coupled to each memory device of the second plurality of memory devices; and
a first termination-control input to receive a first termination control signal and coupled to each memory device of the first plurality of memory devices and to each memory device of the second plurality of memory devices, each memory device of the first and second pluralities of memory devices including circuitry to effect on-die termination in response to the first termination control signal.

14. The memory module of claim 13 further comprising a data signal input and wherein an on-die termination element of a first memory device of the first plurality of memory devices is switchably coupled to the data signal input in response to the first termination control signal to effect on-die termination and wherein an on-die termination element of a second memory device of the second plurality of memory devices is switchably coupled to the data signal input in response to the first termination control signal to effect on-die termination.

15. The memory module of claim 13 wherein the on-die termination elements within the first and second memory devices effect a net termination impedance approximately equal to half the termination impedance of either of the on-die termination elements alone.

16. The memory module of claim 13 further comprising a second termination-control input coupled to each memory device of the first plurality of memory devices and to each memory device of the second plurality of memory devices.

17. The memory module of claim 16 wherein the circuitry to effect on-die termination in response to the first termination control signal includes circuitry to effect the on-die termination in response to the first termination control signal and in response to a second termination control signal received via the second termination-control input.

18. The memory module of claim 17 wherein the circuitry to effect the on-die termination in response to the first termination control signal and in response to the second termination control signal includes circuitry to (i) apply a first termination load if the first and second termination control signals indicate a first termination state, (ii) apply a second termination load if the first and second termination control signals indicate a second termination state, and (iii) disable the on-die termination if the first and second control signal indicate a third termination state.

19. A memory controller to control memory devices including first and second memory devices disposed on a first memory module and coupled in common to a data signaling link, the memory controller comprising:
a data signal output driver to output write data onto the data signaling link; and
control circuitry to (i) output a first memory write command via one or more command signaling links coupled in common to the first and second memory devices, (ii) enable the first and second memory devices to switchably couple respective ones of first and second termination loads to the data signaling link concurrently with arrival of the write data at the first and second memory devices and (iii) output first and second chip-select signals in respective states to enable the first memory device, but not the second memory device, to store the write data in response to the first memory write command.

20. The memory controller of claim 19 wherein the data signal output driver to output the write data via the signaling link comprises circuitry to enable a first signaling current to flow via the signaling link while the first and second termination loads are coupled to the signaling link, and wherein a first portion of the signaling current flows through the first termination load and a second portion of the signaling current flows through the second termination load.

21. The memory controller of claim 20 wherein the control circuitry to enable the first and second memory devices to switchably couple respective ones of the first and second termination loads to the signaling link comprises circuitry to concurrently output first and second termination control signals to the first and second memory devices, respectively.

22. An integrated circuit device for coupling to a memory module via a signaling link, the memory module including first and second memory devices, the integrated circuit device comprising:
- means for outputting a signal onto the signaling link;
- means for concurrently enabling the first and second memory devices to switchably couple respective ones of first and second termination loads to the signaling link;
- means for outputting a first memory write command via one or more command signaling links coupled in common to the first and second memory devices;
- means for outputting a write data value via the signaling link during an interval in which the first and second memory devices are enabled to couple the first and second termination loads to the signaling link; and
- means for outputting first and second chip-select signals in respective states concurrently with enabling the first and second memory devices to couple the first and second termination l(ads to the signaling link, the respective states of the first and second chip-select signals enabling the first memory device, but not the second memory device, to store the write data value in response to the first memory write command.

23. The memory controller of claim 19 wherein the control circuitry is further to enable third and fourth memory devices, disposed a second memory module, to switchably couple respective ones of third and fourth termination loads to the data signaling link concurrently with enabling the first and second memory devices to switchably couple the first and second termination loads to the data signaling link.

24. The memory controller of claim 23 wherein the first termination load is configured to be substantially equal to the second termination load and the third termination load is configured to be substantially equal to the fourth termination load, but the first termination load is configured to be substantially different from the third termination load.

* * * * *